United States Patent
Radhadevi et al.

(10) Patent No.: US 11,893,078 B2
(45) Date of Patent: Feb. 6, 2024

(54) ANALOG DOT PRODUCT MULTIPLIER

(71) Applicant: Ceremorphic, Inc., San Jose, CA (US)

(72) Inventors: Aravinth Kumar Ayyappannair Radhadevi, Hyderabad (IN); Sesha Sairam Regulagadda, Hyderabad (IN)

(73) Assignee: Ceremorphic, Inc., San Jose, CA (US)

( * ) Notice: Subject to any disclaimer, the term of this patent is extended or adjusted under 35 U.S.C. 154(b) by 281 days.

(21) Appl. No.: 17/006,815

(22) Filed: Aug. 29, 2020

(65) Prior Publication Data

US 2022/0066740 A1 Mar. 3, 2022

(51) Int. Cl.
*G06F 17/16* (2006.01)
*G06F 7/544* (2006.01)
*G06G 7/16* (2006.01)

(52) U.S. Cl.
CPC ............ *G06F 17/16* (2013.01); *G06F 7/5443* (2013.01); *G06G 7/16* (2013.01)

(58) Field of Classification Search
CPC ........ G06F 17/16; G06F 17/15; G06F 17/153; G06F 7/5443; G06F 1/04; G06F 1/06; G06G 7/16; G06G 7/12; G06G 7/161; G06G 7/32
See application file for complete search history.

(56) References Cited

U.S. PATENT DOCUMENTS

| 9,069,995 | B1 * | 6/2015 | Cronie | G06G 7/16 |
| 10,417,460 | B1 * | 9/2019 | Youssefi | H03M 1/38 |
| 2010/0225419 | A1 * | 9/2010 | Pan | H03H 15/02 333/174 |
| 2019/0392298 | A1 * | 12/2019 | Oshima | G06F 7/5443 |
| 2022/0013155 | A1 * | 1/2022 | Kumar | G11C 11/54 |

* cited by examiner

*Primary Examiner* — Matthew D Sandifer
*Assistant Examiner* — Carlo Waje
(74) *Attorney, Agent, or Firm* — File-EE-Patents.com; Jay A. Chesavage

(57) ABSTRACT

A dot product multiplier for matrix operations for an A matrix of order 1×m with a coefficient B matrix of order m×m. Processing Elements (PEs) are arranged in an m×m array, the columns of the array summed to provide a dot product result. Each of the PEs contains a sign determiner and a plurality of analog multiplier cells, one multiplier cell for each value bit. The multipliers operate over four clock cycles, initializing a capacitor charge according to sign on a first clock phase, sharing charge on a second phase, canceling charge on a third phase, and outputting the resultant charge on a fourth phase, the resultant charge on each column representing the dot product for that column.

15 Claims, 35 Drawing Sheets

Figure 1A

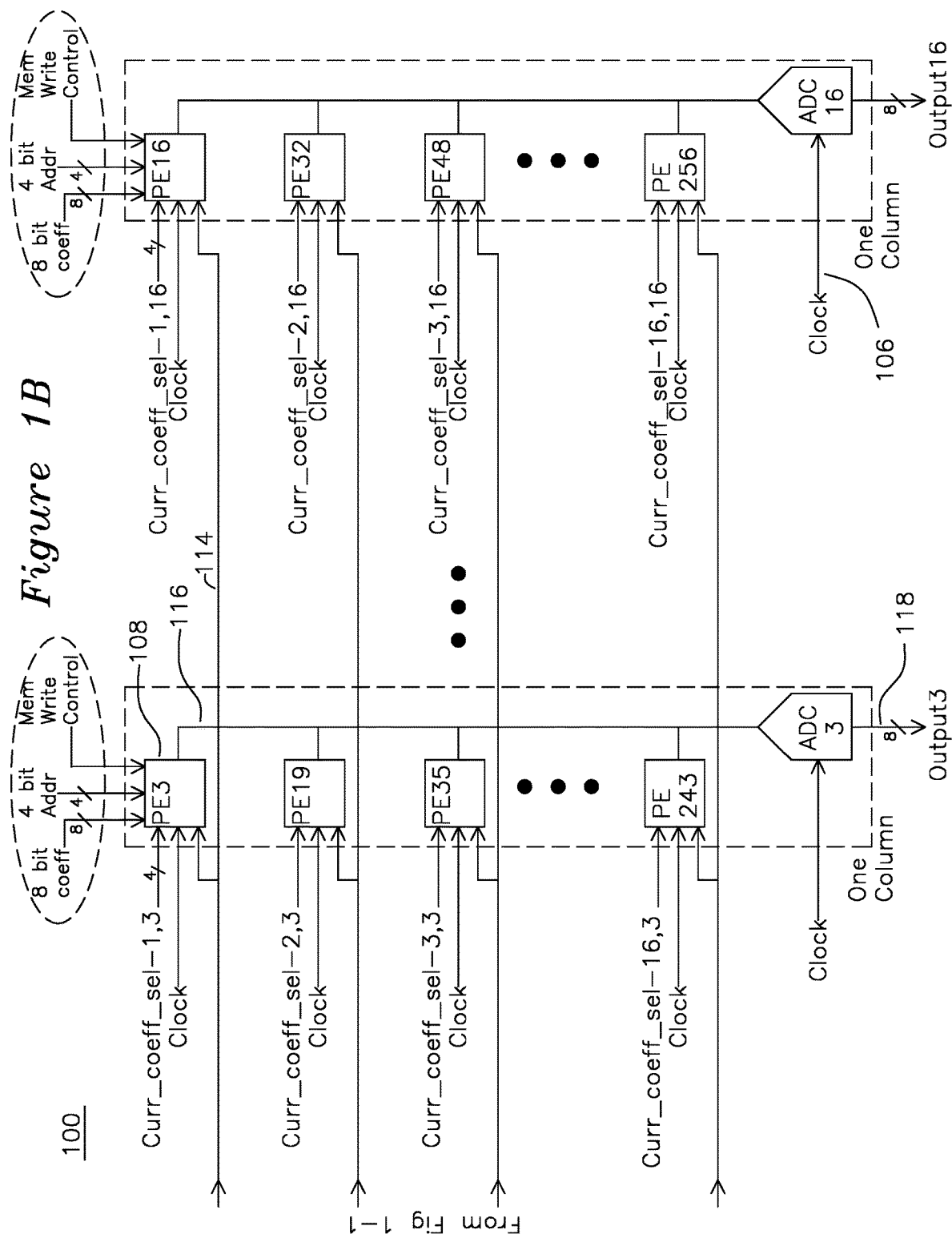

One PE Cell

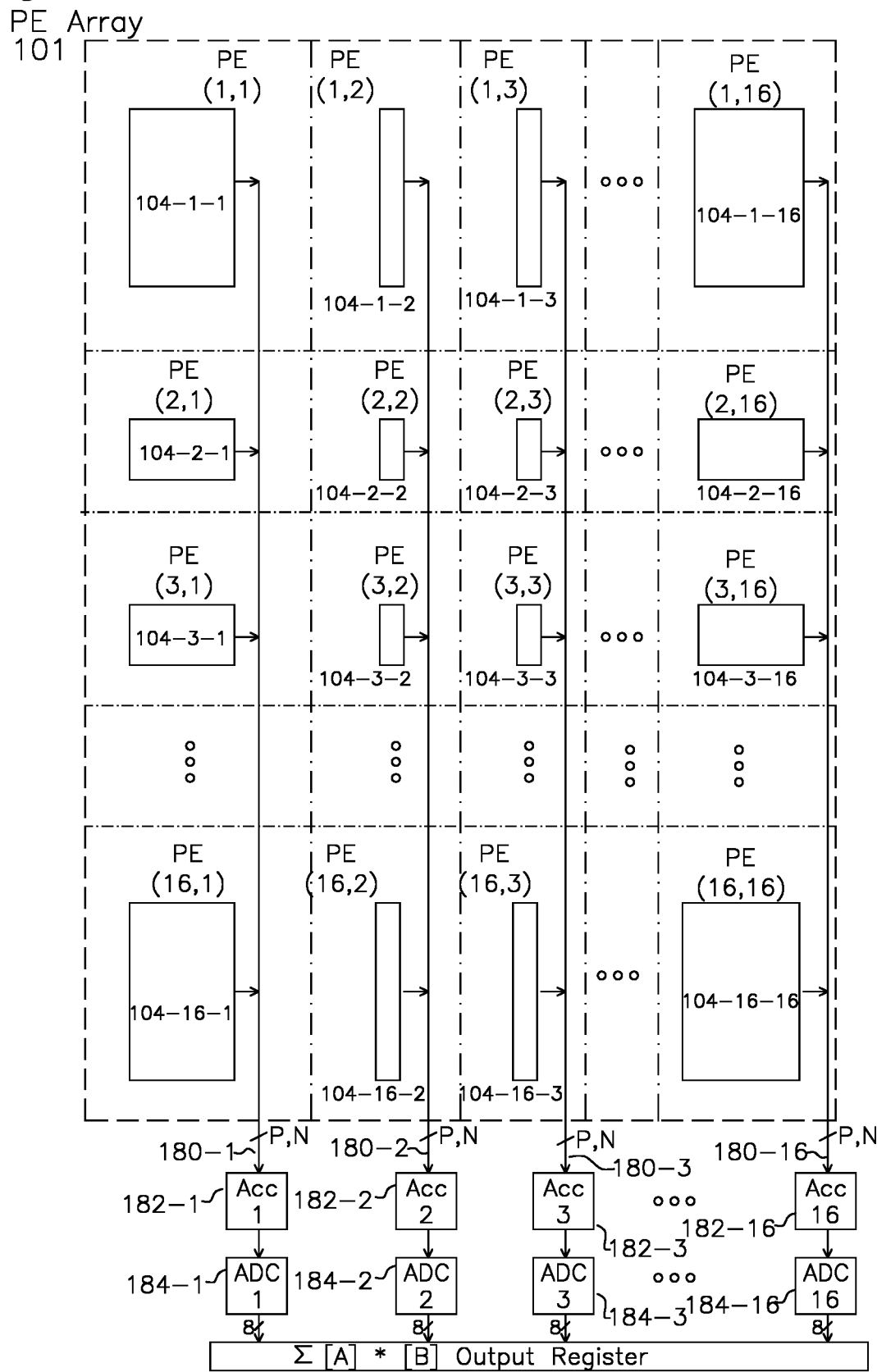
Figure 2D Accumulator and PE cells

Four Phase Clock Generation

Reference Voltage Generators to PE

Four Phase Clock Generation

Row Clock Drivers, r=RowNum

Processing Element (PE) Cell
r=PE RowNum, c=PE ColNum

Processing Element (PE) Cell
r=PE RowNum, c=PE ColNum

Dot Product results (1x16 dot 16x16 each)

Figure 6-3
Multiplication example a=70, b=121

| C | a | b | PH1 Vc | PH1 Qc | PH2 Qc | PH3 Qc | PH4 Qc |
|---|---|---|---|---|---|---|---|
| 64 | $a6$ = 1 | $b6$ = 1 | $V_p$ | $64V_p$ | $\frac{64}{127}70V_p$ | $\frac{64}{127}70V_p$ | |
| 32 | $a5$ = 0 | $b5$ = 1 | 0 | 0 | $\frac{32}{127}70V_p$ | $\frac{32}{127}70V_p$ | |
| 16 | $a4$ = 0 | $b4$ = 1 | 0 | 0 | $\frac{16}{127}70V_p$ | $\frac{16}{127}70V_p$ | |
| 8 | $a3$ = 0 | $b3$ = 1 | 0 | 0 | $\frac{8}{127}70V_p$ | $\frac{8}{127}70V_p$ | |
| 4 | $a2$ = 1 | $b2$ = 0 | $V_p$ | $4V_p$ | $\frac{4}{127}70V_p$ | 0 | |
| 2 | $a1$ = 1 | $b1$ = 0 | $V_p$ | $2V_p$ | $\frac{2}{127}70V_p$ | 0 | |
| 1 | $a0$ = 0 | $b0$ = 1 | 0 | 0 | $\frac{1}{127}70V_p$ | $\frac{1}{127}70V_p$ | |
| $\overline{127}$ | | | | $70V_p$ | | | $\frac{121}{127}70V_p$ |

(PH3 column: Sum all C charge across all C in column → PH4: Sum all C charge in column)

Figure 7
Analog Bitwise Multiplication Process
For Matrix A and coefficient matrix B 720
- for each coefficient of column C of matrix A and coefficients of row r of matrix B:

722
- Determine Sign of result based on MSB(A) and MSB(B)

724
- Simultaneously for A[6:0] & B[6:0]

726
- size of capacitor $C_n = C_{ref}*2^n$

706 Phase 1: 728
708
- If sign + and $A_n=1$:
  charge capacitor $C_n$ to (VrefP − VCM)
- If sign + and $A_n=0$ charge capacitor $C_n$ to 0V
- If sign − and $A_n=1$:
  charge capacitor $C_n$ to (VrefN − VCM)
- If sign − and $A_n=0$ charge capacitor $C_n$ to 0V
- End of Phase 1: charge on Cref as above
  Vc=(VrefP−VCM) or (VrefN−VCM) as above Phase 2: 730
- Remaining charge on Cs of each PE shared inside PE according to bit position Phase 3: 732
- If $B_n=0$: Remove Charge carried from PH2 from $C_n$ Phase 4: 734
- Connect all $C_n$ to output, providing charge from PH3

736
- Sum 16 columns of 7 Cn charges in +/− lines

738
- Convert $\sum V_c$ to digital value

740
- Summary: At end of 4 phases, transfer charge on $C_n$ proportional to Cref*B*A SA Sample Mode (PH4), Bank 1

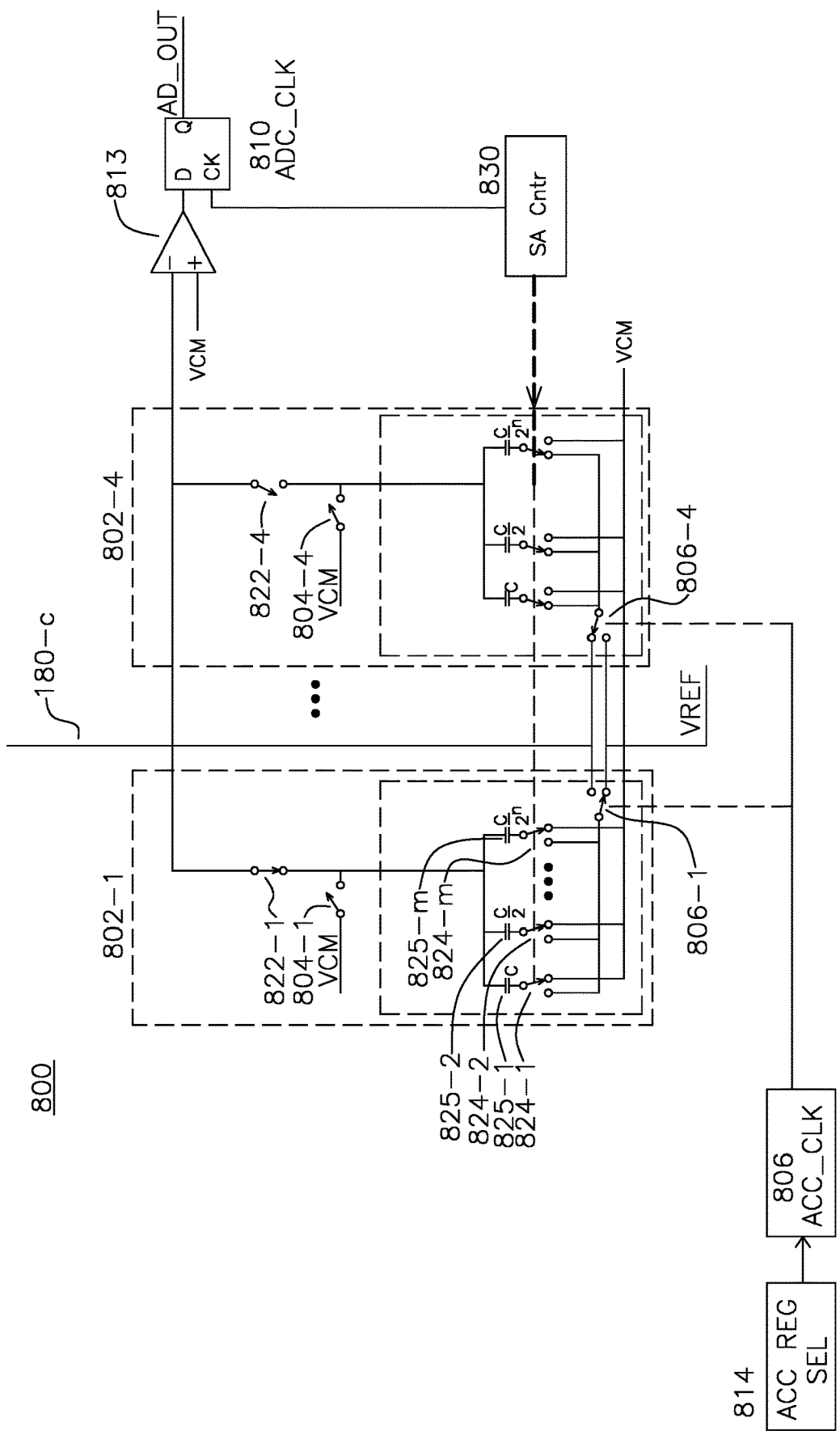

SA Conversion Bank 1

SA Conversion Bank 1

SA Conversion Bank 1

AD_OUT=101 0111

Pos/Neg SA ADC accum/SA architecture

Charge Accumulate Capacitor Bank (n=4 accumulate mode, as shown in fig 9C-3)

Charge Scaling Capacitor Bank (8C caps used for accumulation according to fig 9C-3)

Charge Accumulate Capacitor Bank (n=4 charge scaling mode)

Charge Scaling Capacitor Bank (charge scaling Mode)
See Figure 9C-3 for number of capacitors selected

*Figure 9B-3*

| # Acc Samples | # 8C acc Caps to store | # 8C acc Caps charged | # empty 8C acc caps | # empty 8C acc caps to scale by 2 | # chg scaling caps to scale by 2 |
|---|---|---|---|---|---|
| 1 | 16 | 16 | 0 | 16 | 16 |
| 2 | 8 | 16 | 0 | 16 | 16 |
| 3 | 5 | 15 | 1 | 15 | 14 |
| 4 | 4 | 16 | 0 | 16 | 16 |
| 5 | 3 | 15 | 1 | 15 | 14 |
| 6 | 2 | 12 | 4 | 12 | 8 |
| 7 | 2 | 14 | 2 | 14 | 12 |
| 8 | 2 | 16 | 0 | 16 | 16 |
| 9 | 1 | 9 | 7 | 9 | 2 |
| 10 | 1 | 10 | 6 | 10 | 4 |
| 11 | 1 | 11 | 5 | 11 | 6 |
| 12 | 1 | 12 | 4 | 12 | 8 |
| 13 | 1 | 13 | 3 | 13 | 10 |
| 14 | 1 | 14 | 2 | 14 | 12 |
| 15 | 1 | 15 | 1 | 15 | 14 |
| 16 | 1 | 16 | 0 | 16 | 16 |

Column labels: 970, 971, 972, 973, 974, 975

Charge Accumulate Capacitor Bank (SA Initialization)

Charge Scaling Capacitor Bank (unused in SA Initialization mode)

Charge Accumulate Capacitor Bank (SA conversion)

Charge Scaling Capacitor Bank (unused in SA conversion mode)

Figure 9E
Accumulation, scaling and conversion
(1 column, multiple dot products, see Fig 9C-3)

990 — for each PH4, store charge sequentially in accum C0 to C15 and Charge Scaling bank according to Fig 9B-3 based on number of dot products (Fig 9A)

992 — Connect charged Accum caps and Scaling caps together to distribute/average charge (Fig 9B)

996 — Open (disconnect) charge scaling caps, equalize charge across SA accumulator capacitors (Fig 9C)

998 — accumulator caps perform SA conversion (Fig 9D)

ANALOG DOT PRODUCT MULTIPLIER

The present invention is a continuation in part of U.S. patent application Ser. No. 16/445,238 filed Jun. 19, 2019, claiming priority to Provisional Application 62/711,555 filed Jul. 29, 2018.

FIELD OF THE INVENTION

The present invention relates to vector dot product operations. In particular, the invention relates to the generation of a vector dot product using analog methods.

BACKGROUND OF THE INVENTION

In the existing technology, there are hardware accelerators for different applications such as Convolution Neural Network (CNN). The basic operation of a CNN involves dot product or Multiplication and Accumulation (MAC). In the digital domain, Multiplication and Accumulation (MAC) operation is performed by using a set of digital circuits, which operate in a sequence to realize multiplication and addition. These digital circuits are very power hungry and are not an optimum solution for low power real time applications.

The multiplication and accumulation (MAC) operations can be efficiently implemented in Analog domain with very low power consumption. The MAC operation in analog circuit domain can be realized in multiple methods. The two different methods for realizing multiplication and addition operation in Analog domain are i) using capacitor circuit ii) using resistor circuit.

In a conventional circuit using capacitors, the multiplication operation is realized by charging the analog input into one capacitor value which is proportional to the digital input and, sharing the charge into another fixed value capacitor. However, for performing several independent multiplications in a sequence (one after other), the capacitors are needed to be reset to zero in between successive multiplication operations. This reset operation requires an extra clock cycle. By taking extra clock cycle to reset the capacitors, the circuit operation becomes slow or it needs higher power to operate the circuit at higher speed. At the same time by resetting all the capacitors to zero, the charge which was stored in the capacitors is completely wasted in between each successive operation. This necessitates the input source to supply more energy to freshly charge the capacitors in each computing cycle, which requires additional power, and more charging time which also slows down the operation of the circuit.

To implement a conventional 8 bit multiplier unit with resistors, it requires $2^8$ (=256) resistors and 256 switches to generate 256 distinct voltage samples from the input voltage and occupies larger area similar to the single resistive string digital to analog converters (DACs). To overcome this problem, researchers used two or more resistive strings, which reduces overall area. Various techniques are reported in the design of higher resolution DACs with two or more resistive strings as disclosed in U.S. Pat. No. 3,997,892, US2018/0183451A1, U.S. Pat. No. 5,703,588.

As disclosed in U.S. Pat. No. 3,997,892, and US2018/0183451A1, the two resistive strings are connected through buffers to avoid the loading effect of sub resistive string on the main resistive string. The buffers dissipate additional power and occupy extra die area.

Instead of isolating the main resistive string with the sub resistive string with buffer, the use of a current Source is suggested in U.S. Pat. No. 5,703,588 by utilizing a constant current to drive the Sub-resistive String. The design and application of an additional current sources for the sub resistive string increases the complexity of the overall system. However, connecting sub resistive string on main resistive string with switches introduces variation in the output voltage due to the resistance of the switches.

In order to overcome the problems of the existing technology as stated herein above paragraphs, the present inventors have developed a hybrid architecture comprises individual processing elements (PEs), ADCs and DACs, which are connected in a unique manner wherein the individual processing elements are realized by unique methods using i) capacitors and ii) resistors whereby producing multiple MAC outputs in a clock duration with very low power consumption.

The vector dot product [Y] for a matrix [A] of 1×m dimension and matrix [B] of m×m dimension is expanded for m=3 follows:

$$Y = |a1 \ a2 \ a3| \cdot \begin{vmatrix} b11 & b12 & b13 \\ b21 & b22 & b23 \\ b31 & b32 & b33 \end{vmatrix} = [(a1*b11 + a2*b21 + a3*b31)$$

$$(a1*b12 + a2*b22 + a3*b32)(a1*b13 + a2*b23 + a3*b33)]$$

As the order of the matrices of the computation grow, the number of separate computations grows. For the above 1×3 by 3×3 dot product, there are 9 multiplies and 9 additions. For a 16×16 matrix dot product, there are 512 multiplications and 512 additions. When the dot product is computed using digital signal processing, each of the matrix coefficients represents a value such as 8 bits or more, which increases the complexity of each of the multiplier elements.

Hexadecimal representation is indicated with the '0x' prefix followed by hexadecimal notation of the following value. Various different numerical formats may be used in a multiply accumulator device, including floating point formats and integer formats. The integer formats include:

(a) unsigned integer (an example 8 bit integer has range 0 to 255 corresponding to 0x00 to 0xff);

(b) signed integer (an example 8 bit signed integer has range −127 to +127 corresponding to 0x80→0x00→0x7f), and (c) sign plus int (0xff is −127, 0x7f is +127), each format of which is known in the prior art.

The present invention is operative with sign plus integer format, which has the convenience that the sign bits may be treated separately from the integer multiplication.

It is desired to provide an analog dot product multiplier architecture for performing matrix dot products.

OBJECTS OF THE INVENTION

A first object of the invention is to provide a method for saving power in a real time hardware processing unit.

A second object of the invention is to provide a system for saving power in a real time hardware processing unit.

A third object of the invention is a dot product multiplier for multiplying a 1×m A matrix with an m×m B matrix to form a dot product, each element of the A matrix and each element of the B matrix comprising a sign bit and value bits, the dot product multiplier comprising:

a clock generator providing four non-overlapping phases of clock per clock cycle, the four phases being PH1, PH2, PH3, PH4;

a plurality of processing elements arranged in said m columns and said m rows, each processing element receiving an 'a' element of the A matrix and a 'b' element of the B matrix and generating a processing element output;

each processing element comprising:

a sign voltage source providing a sign voltage which is a positive voltage for positive multiplication results and a comparatively negative voltage for negative multiplication results based on a sign bit of the 'a' element and sign bit of the 'b' element;

a bit multiplier for each particular 'a' element value bit $a_n$ and each 'b' element value bit $b_n$, each bit multiplier having an output, the bit multiplier comprising:

a capacitor having a capacitance Cref*$2^n$, the capacitor initialized to the sign voltage during a first clock phase if $a_n$=1, and initialized to 0V if $a_n$=0;

the bit multiplier coupling the capacitor to capacitors of other bit multipliers during the second clock phage PH2;

the bit multiplier zeroing the charge on the capacitor if $b_n$=0 during a third phase PH3;

the bit multiplier coupling the capacitor of the bit multiplier to the processing element output during the fourth phase PH4 each of the m columns having an accumulator, the accumulator receiving a transferred charge from the bit multiplier outputs in a respective column during the fourth phase PH4;

each accumulator converting the transferred charge to a digital value indicating a dot product value for an associated column.

A fourth object of the invention is a process for forming dot products of a 1×m A matrix with an m×m B matrix, the process operative on an m column and m row array of processing elements, the A matrix and the B matrix having elements comprising a sign bit and n value bits, each processing element comprising a sign voltage source and a plurality n of multipliers, each multiplier operative on a unique bit n of a value of the A matrix and a value of the B matrix, the process comprising:

charging a capacitor in each multiplier to a sign voltage provided by the sign voltage source during a first clock phase PH1 if a corresponding bit $a_n$ is 1; sharing capacitor charge across all multiplier capacitors during a second clock phase PH2;

clearing a charge from the multiplier capacitor if $b_n$ is 0 during third clock phase PH3;

connecting all processing element multiplier capacitors of each column together and converting the charge of each column to a digital output value during a fourth clock phase.

A fifth object of the invention is a Processing Element (PE) cell for forming an analog product of an 'a' value and a 'b' value, the 'a' value and 'b' value having a sign bit and a plurality n of value bits, the PE cell comprising:

a sign voltage generator comparing the sign bit of the 'a' value and the 'b' value and generating an output voltage VrefP if the 'a' sign bit and 'b' sign bit are the same and generating an output value VrefN if the 'a' sign bit and 'b' sign bit are different values;

a plurality of multipliers, each multiplier comprising:

a capacitor having a first terminal coupled to an output switch;

the capacitor having a second terminal coupled to the first terminal during a first clock phase PH1 if $a_n$=0 and coupled to the sign determiner output if $a_n$=1 during the first clock phase PH1;

the capacitor having a ClkCHSH1 switch coupling the second terminal of the capacitor to VCM during the first clock phase PH1 when $a_n$=1;

the capacitor first terminal connected to a multiplier output, the multiplier output connected to other multiplier outputs during a second clock phase PH2;

the capacitor first terminal and capacitor second terminal both coupled to VCM during a third clock phase PH3 if $b_n$=0;

the capacitor second terminal coupled to VCM during a fourth clock phase PH4;

during a fourth phase PH4, the processing element operative to couple the capacitor first terminal of all multipliers to a processing element output, the processing element also coupling the capacitor second terminal to VCM, the processing element output thereby generating an analog capacitor charge value proportional to the multiplication of A*B.

A sixth object of the invention is a process for performing a multiplication of two digital input values which results in the formation of an analog result which is converted to a digital output, the process comprising:

examining the two digital values to estimate a successive approximation starting point for a successive approximation analog to digital converter;

using the starting point to configure an initial state of the analog to digital converter.

A seventh object of the invention is a hybrid analog to digital converter operative with a multiplier accepting digital inputs and generating an analog output to be converted to a digital value, the hybrid analog to digital converter examining the digital inputs being multiplied and estimating a start point for a successive approximation analog to digital conversion, thereby saving successive approximation steps by using knowledge of the digital inputs to estimate a starting point for conversion.

SUMMARY OF THE INVENTION

The present invention provides a hybrid hardware accelerator for different applications such as Convolution Neural Network (CNN). The basic operation of a CNN involves a dot product, or Multiplication and Accumulation (MAC). According to one embodiment of the present invention, the MAC operation is performed by using analog-digital hybrid architecture, which performs 256 multiplications and additions at a time. The system comprises 256 Processing Elements (PE) (108), which are arranged in a matrix form (16 rows and 16 columns). In the system, the digital inputs (110) are converted to analog signal (114) using digital to analog converters (DAC) (102). In the present invention, 16 DACs are used to generate analog inputs for PE elements. Each DAC broadcasts its analog output to all the PE cells in a row as their analog inputs. One PE (108) produces one analog output (115) which is nothing but the multiplication of its analog input (114) and digital weight input (112). The implementation of PE is done by using i) capacitors and switches and ii) resistor and switches. The outputs from multiple PEs (108) in a column are connected together to produce one analog MAC output i.e. an analog dot product output (116). In the similar manner, the system produces 16 analog MAC outputs (118) corresponding to 16 columns. Analog to digital converters (ADC) 105 are used to convert the analog MAC output (116 of FIG. 1B) to digital form (118). There are 16 ADCs are used wherein one for each column. In the present invention, the 256 PE cells which are arranged in 16×16 matrix form, 16 DACs and 16 ADCs are used for explanation purpose only. However, the present invention is also applicable for implementing a system using "m×n" PE cells arranged in a matrix of "m" rows and "n" columns wherein "m" number of DACs and "n" number of ADCs are used.

According to another aspect of the present invention, there is provided a method for saving power in a real time hardware processing unit. The method comprising: connecting a plurality of processing elements (PEs) (108) in a matrix form; wherein a first set of the processing elements (PEs) (108) comprises a multiple sets of the processing elements (PEs) (108); wherein each set of the multiple sets of the processing elements (PEs) (108) of the first set comprises a plurality of the processing elements (PEs) (108) being adapted to connect in a row; wherein a second set of the processing elements (PEs) (108) comprises a multiple sets of the processing elements (PEs) (108); wherein each set of the multiple sets of the processing elements (PEs) (108) of the second set comprises a plurality of the processing elements (PEs) (108) being adapted to connect in a column; connecting a plurality of digital to analog converters (DAC) (102) to each the set of the multiple sets of the processing elements (PEs) (108) of the first set; wherein converting a plurality of digital inputs (110) to a first analog output (114) using each the digital to analog converter (DAC) (102); sending the first analog output (114) to the plurality of the processing elements (PEs) (108) being adapted to connect in the row using each the digital to analog converters (DAC) (102) such that the first analog output of the digital to analog converters (DAC) (102) being an input to the plurality of the processing elements (PEs) (108) being adapted to connect in the row; generating a second analog output (115) corresponding to each the processing element (PE) (108); wherein the second analog output of each the processing element (PE) (108) is a product of the first analog output of the digital to analog converter (DAC) and a digital weight input (112); generating an analog dot product output (116) using each the set of the multiple sets of the processing elements (PEs) (108) of the second set; connecting each the set of the multiple sets of the processing elements (PEs) (108) of the second set using an analog to digital converter (ADC); wherein converting the analog dot product output (116) to a digital output (118) using each the analog to digital converter (ADC) (105).

According to another embodiment of the present invention, the circuit implementation of one multiplication operation between an analog input and a digital input is done by using capacitors (210) and switches (212). Each capacitor (210) is connected to the analog input (202a/202b) through two switches (212), wherein each switch is controlled by the "ph1" clock (214a) and the corresponding digital input bit (204) respectively. In addition to that, each capacitor is short circuited through two switches, wherein each switch is controlled by the "ph1" clock (214a) and the complement of the corresponding digital input (208) bit. Hence, with the same clock ("ph1") (214a), the analog input (202a/202b) will be sampled into the capacitors corresponding to the digital input (204) bits which are "1", and rest of the capacitors will be reset. In the present invention, the capacitors (210) are reset to zero in between successive multiplication operations without extra clock cycle.

According to another embodiment of the present invention, a sub resistive string having 16 equal value of series resistors (R16 to R31) is directly connected at the node of the first resistor (R0) of the main resistor string (R0 to R15). The resistance of the first resistor (R0) of the main resistive string is increased to maintain the effective branch resistance equal to the all other branch resistances (R1 to R15) of the main string. In this way, the main resistive string is dividing the input voltage into 16 distinct values with each step being vin/16 and the sub resistive string dividing the node voltage which is equal to Vin/16 into 16 sub divisions with each step being vin/256. In the present invention, the two resistive strings are connected without having switches or buffers and produce 16 main and 16 sub monotonic voltages. The main resistive string voltage sampled on the top plate (314a/316a) of the capacitor (314/316) through switches with respect to the 4 MSB bits and corresponding decoders during 'ON' period of the clock; Similarly, the bottom plate (314b/316b) connects to the sub resistive string node through switches with respect to 4 LSB bits and corresponding decoders during 'ON' period of the clock. For each input, the present invention produces the output voltage (310) which is proportional to the product of input voltage (302) and the coefficient of digital input (B) (304).

In another example of the invention, a matrix multiplier-accumulator for computing dot products and operative on sign plus integer format forms dot products of a 1×m A matrix with an m×m B coefficient matrix using a plurality of individual analog processing elements (PE) of the same order n as the B matrix forming the dot product, in the present examples, a 16×16 array of PEs performs multiply-accumulate operations on a 1×16 A matrix and 16×16 B matrix to generate a 1×16 dot product result. Each PE receives corresponding B coefficients prior to MAC operation. For the case where each respective element a,b of the A and B matrix is an 8 bit digital value, the a values are encoded with clock phases derived from a clock and presented serially to each PE, the PE having been pre-loaded with 16 b coefficients specific to each PE. On each clock cycle operative over four phases, the bits of a are multiplied with the bit values of the locally stored b matrix, with each bit result stored in capacitors having a weighted value $C=Cref*2^n$ where n=[0,1,2,3,4,5,6] corresponding to the bit significant of the current bit operation, and each of the corresponding bits of A and B are multiplied, and the charge stored in each PE storage capacitor with value $C=Cref*2^n$ and transferred to an accumulator on each fourth clock phase PH4. Each PE operates on a clock cycle comprising a four phase clock, the first phase applying a charge to capacitors in multipliers where $a_n=1$ and clearing the charge when $a_n=0$, the polarity of the charge determined by the sign bits a[7] and b[7], the second phase distributing the stored charge to capacitors of other multipliers in the PE, the third phase removing charge from capacitors where $b_n=0$, and the fourth phase transferring the multiplier capacitor charges for each PE of each column to the accumulator. Each of the PEs operate independently and concurrently, and at the end of each clock cycle, the capacitance charges of PEs in columns are combined, and the combined charge values from the 16 PEs are transferred to the accumulator and each of the 16 accumulated column output values is converted to a digital value and output as the dot product.

In another example of the invention, an analog cell multiplier receives digital values and generates an analog output for conversion to a digital value using a successive approximation analog to digital converter. A start point estimator examines the two digital inputs and makes a rough estimate of the SAR start point and provides the start point as a switched capacitor configuration starting point for conversion, thereby reducing the number of successive approximations required to perform the conversion.

BRIEF DESCRIPTION OF THE DRAWINGS

Features, aspects, and advantages of the present invention will be better understood when the following detailed description is read with reference to the accompanying drawings in which like characters represent like parts throughout the drawings, wherein:

FIGS. 1A and 1B illustrate block diagram of 16×16 MAC array, in accordance with an embodiment of the present invention;

FIG. 2D is the MAC of FIG. 2C showing the PE cells with output connections, and output accumulators and ADCs generating the output result.

FIG. 6-1 is a simplified schematic diagram showing operations during PH1 and PH2

FIG. 6-2 is a simplified schematic diagram showing operations during PH3 and PH4.

FIG. 6-3 shows the accumulated charges for an example multiplication.

FIG. 7 is a flowchart of the operations of the dot product multiplier showing the capacitor C charge and Vint and Vo status during each of the four clock phases.

FIG. 8B shows the SA ADC of FIG. 8A in an SA conversion mode.

FIGS. 8C-1, 8C-2, 8C-3 show block diagrams for the progression of first few example SA analog to digital conversions.

FIG. 8C-4 shows waveforms of operation for the SAR ADC of FIGS. 8A and 8B.

FIGS. 9, 9A-1, 9A-2, 9B-1, 9B-2, 9C-1, 9C-2, 9D-1, and 9D-2 show a block diagram for a positive/negative SA ADC with expanded dot product capability.

FIG. 9B-3 shows a table for configurations of the charge scaling bank of FIG. 9.

FIG. 9E shows a flowchart for the operation of FIG. 9.

It should be understood that the drawings are an aid to understand certain aspects of the present invention and are not to be construed as limiting.

Resistive MAC Detailed Description

While system and method are described herein by way of example and embodiments, those skilled in the art recognize that a method and system for saving power in a real time hardware processing unit are not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include", "including", and "includes" mean including, but not limited to.

The following description is full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings and the appended claims. While the system and method described herein are provided with a certain degree of specificity, the present technique may be implemented with either greater or lesser specificity, depending on the needs of the user. Further, some of the features of the present technique may be used to advantage without the corresponding use of other features described in the following paragraphs. As such, the present description should be considered as merely illustrative of the principles of the present technique and not in limitation thereof, since the present technique is defined solely by the claims.

It is worth noting that the present discussion relates to exemplary embodiments, and the appended claims should not be limited to the embodiments discussed herein. Disclosed embodiments provide a method and system of saving power in a real time hardware processing circuit.

Figure 1A:
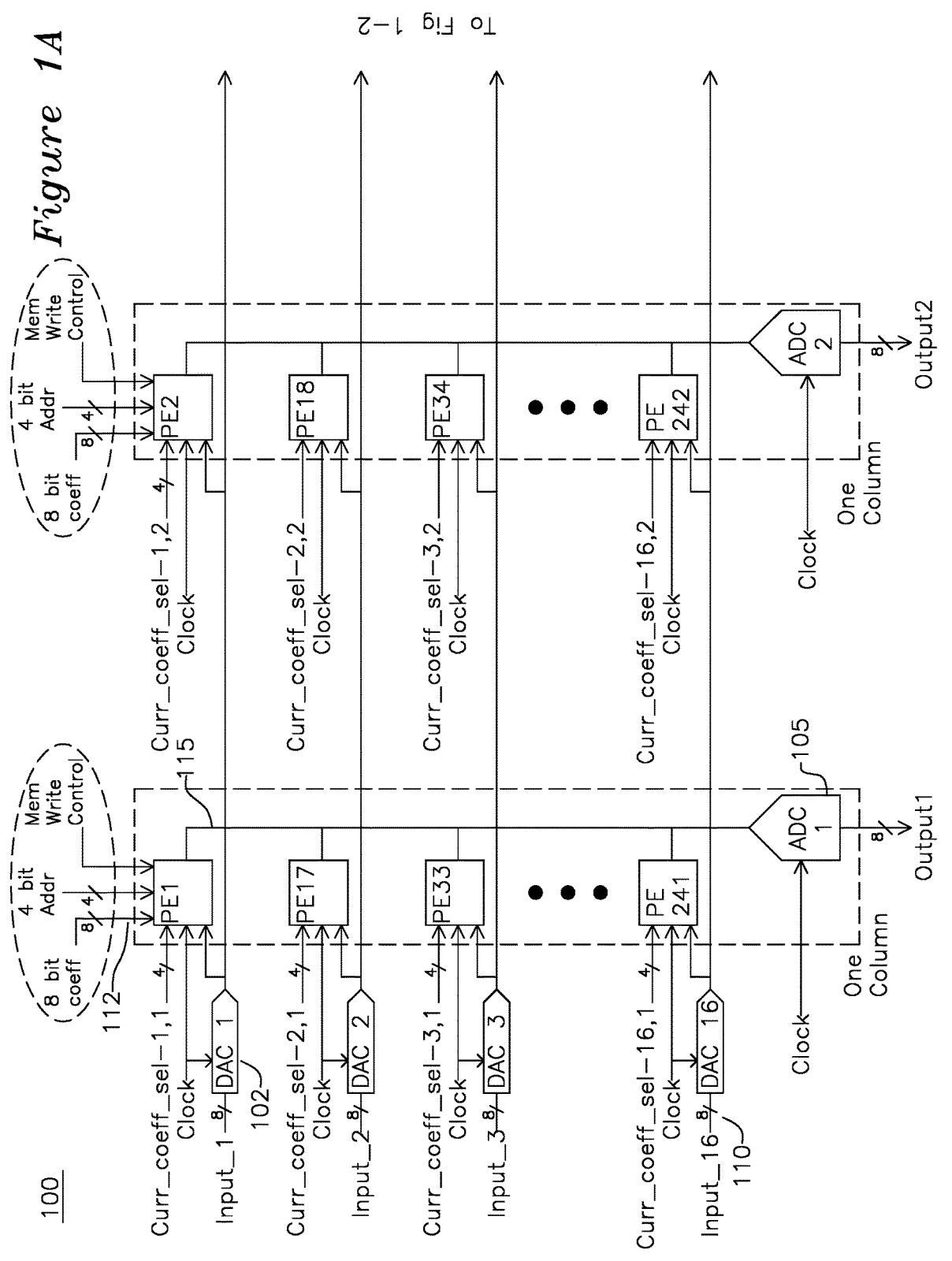
Figure 1C:
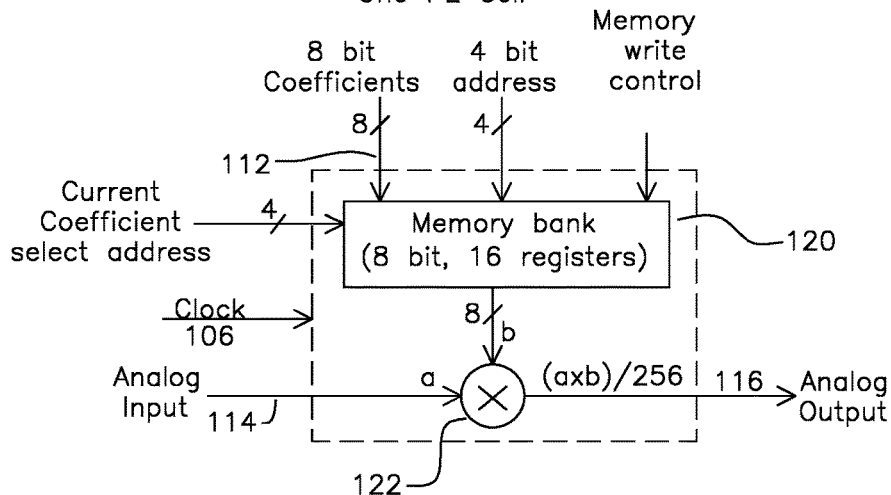
FIG. 1C illustrates a schematic diagram of a Processing Element (PE) unit, in accordance with an embodiment of the present invention.

FIGS. 1A and 1B show a block diagram of a 16×16 MAC array, in accordance with an embodiment of the present invention. The present invention provides a hardware accelerator for Convolution Neural Network (CNN). The basic operation of a CNN involves dot product or Multiplication and Accumulation (MAC). In this invention, the MAC operation is performed by using analog-digital hybrid architecture, as shown in FIGS. 1A and 1B, which performs 256 multiplications and additions at a time (within one clock period).

The system comprises 256 (PE1-PE256) Processing Elements (PE) (108), which are arranged in a matrix form (16 rows and 16 columns). The digital input (110) is common for each PE in a row and hence requiring 16 digital inputs (110). However, the digital weights (112) are unique to each PE cell (108).

The inputs, which are provided to the system, are clock (106), 16 digital inputs of 8-bit width (110) and 8-bit digital weights (minimum of 256 weights from a memory) (112). Each of the 16 digital input is common to all PE cells in a row. The 8-bit width for digital input is taken or mentioned here for explanation purpose only. However, the present invention is also applicable to n-bit width. By taking the inputs, the system produces 16 MAC outputs in digital form (8-bit) (118) as shown in FIGS. 1A and 1B. The operational part of the system for producing the output by taking the inputs is as follows:

At first, the digital inputs (110) are converted to analog signal (114) using digital to analog converters (DAC) (102). Each row uses one DAC (DAC1-DAC16) (102) and converts the digital input to the analog output and then the analog output (116) obtained from the DAC (102) is connected to all PE cells (108) in the row.

The processing element (PE) (108) is the primary component in the accelerator system. As shown in the FIG. 1C, each PE (108) comprises a multiplier (122) and a small amount of storage memory (120). The digital weights (8-bit digital number) (112) are stored in the storage memory (120) and are used for several times. The multiplier (122) takes an analog input (114) and a digital weight (digital input) (112) and multiplies both. In other words, one processing element (108) produces one analog output (116) which is nothing but the multiplication of the analog input (114) and the digital weight input (112). The outputs from multiple PEs (108) are connected together, which is equivalent to accumulation, to produce one analog MAC output (116).

The system or architecture produces 16 (8-bit) MAC outputs (118) in single clock (106) cycle and each MAC output (118) is computed by performing 16 multiplications and adding all the 16 multiplication outputs. In other words, the accumulation operation is performed by combining the outputs of all the 16 PEs in a column. In the similar manner, the system produces 16 MAC outputs (118) corresponding to 16 columns.

Accumulation operation is performed in column basis, thus producing 16 analog outputs (116). Analog to digital converters (ADC) (105) are used to convert the analog MAC output (116) back to digital form (118). There are 16 ADCs (ADC1-ADC16) present in the system, which are used for converting the analog outputs (116) to digital form (118), wherein one ADC (105) is used for one column respectively.

Figure 1D:
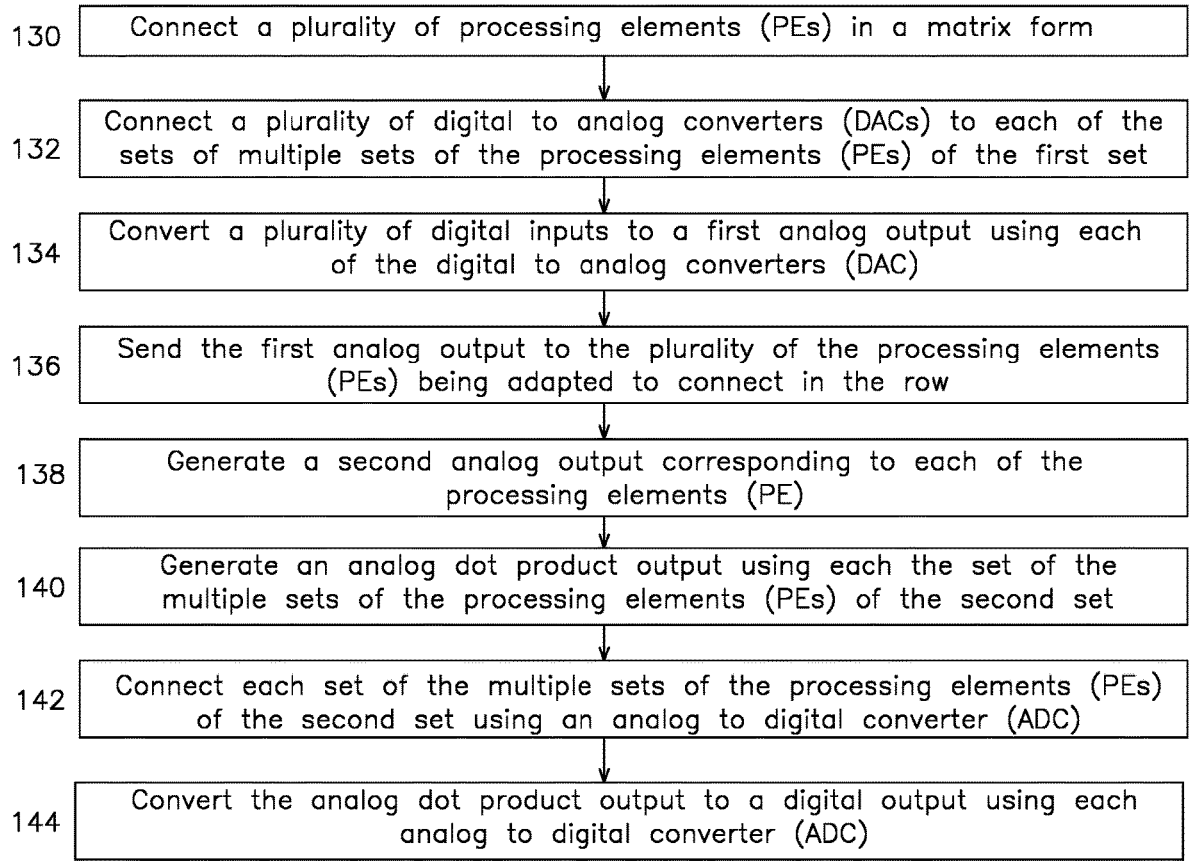
FIG. 1D illustrates a flow diagram of a method for saving power in a real time hardware processing unit, in accordance with an embodiment of the present invention.

FIG. 1D illustrates a flow diagram of a method for saving power in a real time hardware processing unit, in accordance with an embodiment of the present invention. At step 130, connect a plurality of processing elements (PEs) (108) in a matrix form. A first set of the processing elements (PEs) (108) comprises a multiple sets of the processing elements (PEs) (108); wherein each set of the multiple sets of the processing elements (PEs) (108) of the first set comprises a plurality of the processing elements (PEs) (108) being adapted to connect in a row. A second set of the processing elements (PEs) (108) comprises a multiple sets of the processing elements (PEs) (108); wherein each set of the multiple sets of the processing elements (PEs) (108) of the second set comprises a plurality of the processing elements (PEs) (108) being adapted to connect in a column.

At step 132, connect a plurality of digital to analog converters (DAC) (102) to each set of the multiple sets of the processing elements (PEs) (108) of the first set. At step 134, convert a plurality of digital inputs (110) to a first analog output (114) using each digital to analog converter (DAC) (102). At step 136, send the first analog output (114) to the plurality of the processing elements (PEs) (108), which are adapted to connect in the row, using each the digital to analog converters (DAC) (102) such that the first analog output of the digital to analog converters (DAC) (102) being an input to the plurality of the processing elements (PEs) (108), which are adapted to connect in the row.

At step 138, generate a second analog output (115) corresponding to each the processing element (PE) (108), wherein the second analog output of each the processing element (PE) (108) is a product of the first analog output of the digital to analog converter (DAC) and a digital weight input (112).

At step 140, generate an analog dot product output (116) using each set of the multiple sets of the processing elements (PEs) (108) of the second set. At step 142, connect each the set of the multiple sets of the processing elements (PEs) (108) of the second set using an analog to digital converter (ADC). At step 144, convert the analog dot product output (116) to a digital output (118) using each the analog to digital converter (ADC) (105).

Figure 1E:
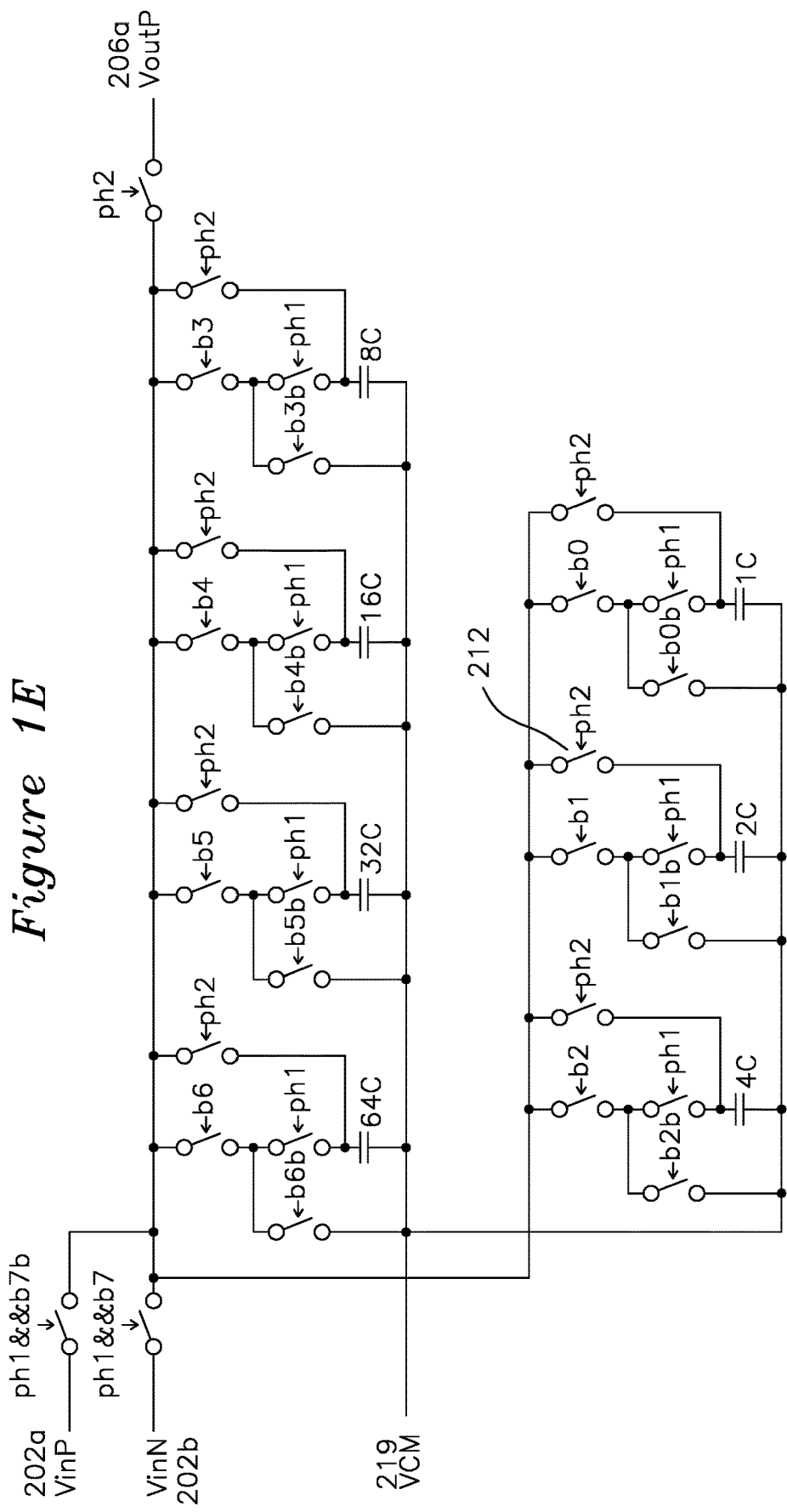
FIGS. 1E and 1F illustrates a schematic diagram of multiplier implementation using capacitors, in accordance with an embodiment of the present invention.
Figure 1F:
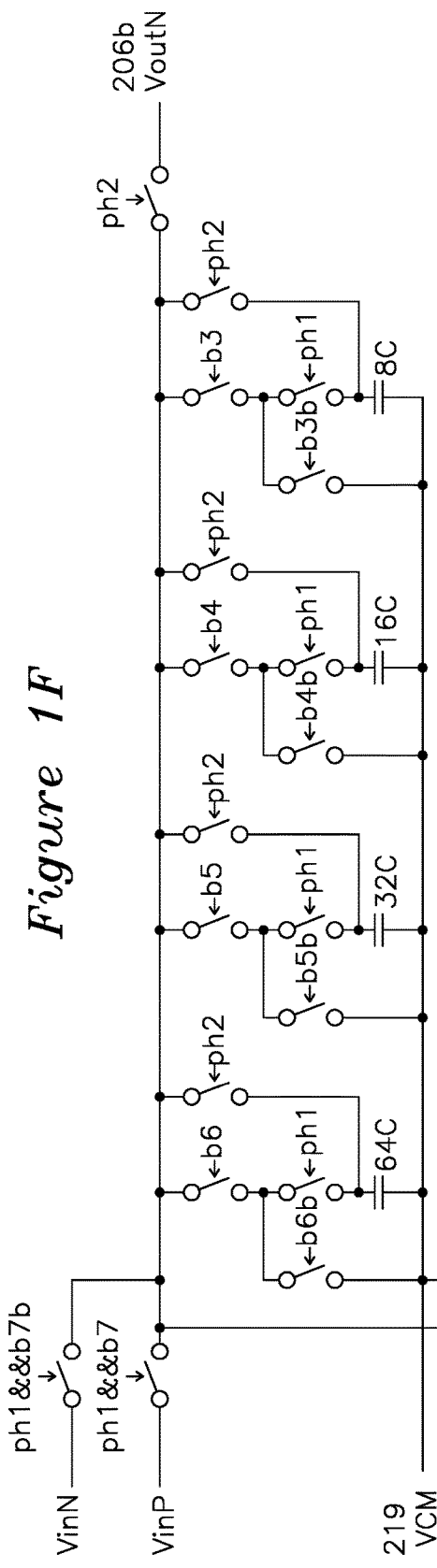
Figure 1H:
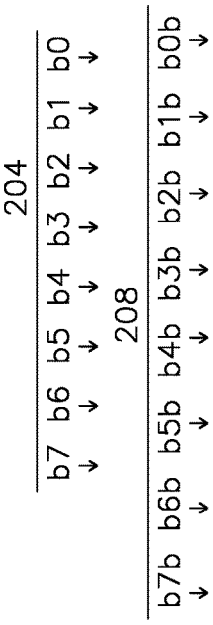
FIG. 1H is a diagram of the inputs [b7:b0] and complement inputs [b7b:b0b]
Figure 1G:
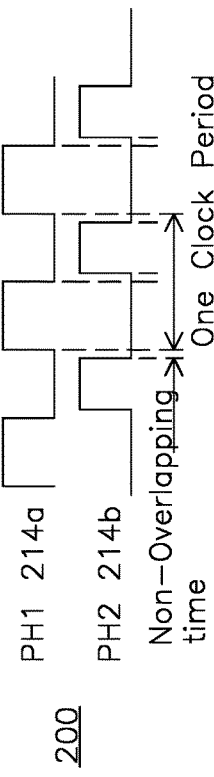
FIG. 1G is a waveform plot of ph1 and ph2.

FIGS. 1E and 1F (200) illustrate a schematic diagram of multiplier implementation using capacitors (210), in accordance with an embodiment of the present invention. As shown in the figures, the circuit implementation of one multiplication operation between an analog input (202a/202b) and a digital input (204) is done by using capacitors (210) and switches (212). The circuit takes a fully differential analog input (Vinp (202a), or Vinn (202b) with respect to a common voltage VCM 219), a 8-bit digital input [b7:b0] (204) of FIG. 1H in sign-magnitude form where Most Significant Bit (MSB) represents sign, and a two phase non-overlapping clock signal (ph1 (214a), ph2 (214b)) of FIG. 1G). The 8-bit width for digital input is taken or mentioned here for explanation purpose only. However, the present invention is also applicable to n-bit width.

The circuit comprises a set of binary weighted capacitors (210) and multiple switches (212). The set of binary weighted capacitors, namely 1C, 2C, 4C, 8C, 16C, 32C and 64C, are connected with multiple switches (212), which are controlled by clock (214a/214b) and digital input (204), in a particular pattern. Here, "C" is the value of a unit capacitor. To realize differential implementation, this multiplier has two copies of same circuit wherein the difference between them are the analog input (202a or 202b) and analog output (206a or 206b). Hereafter, one half circuit is explained exclusively and, the other half circuit performs similarly with the complementary analog input and produces complementary analog output.

With respect to the sign bit of the digital input, one half of the differential analog input i.e. either Vinp (202a) or Vinn (202b), is sampled to the circuit during the "ON" period of the "ph1" clock (214a). If sign-bit is "0", "Vinp" (202a) is sampled to the circuit during the "ON" period of the "ph1" clock (214a). If sign-bit is "1" then "Vinn" (202b) is sampled to the circuit during the "ON" period of the "ph1" clock (214a).

The pattern of arranging the capacitors (210), switches (212) is shown in the FIGS. 1E and 1F, wherein each capacitor is connected to the analog input (202a/202b)

through two switches (212), each switch is controlled by the "ph1" clock (214a) and the corresponding digital input (204) bit respectively. The digital input bit is one among "b6" to "b0" bits. In addition to that, each capacitor (210) is short circuited through two switches, (212), wherein each switch is controlled by the "ph1" clock (214a) and the complement of the corresponding digital input (208) bit. Hence, with the same clock ("ph1"), the analog input (204a/204b) is sampled into the capacitors (210) corresponding to the digital input (204) bits which are "1", and rest of the capacitors are reset. In other words, both sampling of analog input and reset operation are performed in the same clock cycle. For example, if the digital input bit "b5" is "1" and "ph1" is "ON", then "32C" is connected to "Vinp(202a)/Vinn(202b)". If "b5" is "0" and "ph1" is "ON" then "32C" is reset. Advantages of this arrangement/pattern are, (i) no additional clock phase is required to reset the capacitors, (ii) the existing charge on the capacitors are reused in the next operation so that the power requirement for driving the analog inputs (202a/202b) in each cycle is reduced.

Operation of the Circuit:

During "ON" time of "ph1" clock (214a), the analog input (Vinp (202a) or Vinn (202b) which is decided by the sign bit (MSB)) is sampled into the capacitors (210) corresponding to the digital input (204) bits which are "1". For example, if digital input is "01011011(2)" then the analog input "Vinp" is sampled into 64C, 16C, 8C, 2C and 1C capacitors through the switches (212) controlled by corresponding digital input (204) bits namely b6, b4, b3, b1, b0. Hence the total charge is Qin=Vinp*91C (91C=64C+16C+8C+2C+1C). At the same time the capacitors namely 32C and 4C are reset through the switches controlled by the complements of the corresponding digital input bits namely b5b and b2b. Hence the charge on the two capacitors is zero.

During the "ON" time of "ph2" clock (214b), all the capacitors are connected in parallel through the switches (212). Since all the capacitors are connected in parallel, the charge stored during the "ON" time of "ph1" clock (214a) is shared among all the capacitors. Hence generated voltage output (206a) during the "ON" time of "ph2" (214b) is corresponding to the product of analog and digital inputs.

For example, as stated in the previous example, if the stored charge is Qin=Vinp*91C, the generated output voltage is
Voutp=Vinp*91C/127C=Vinp*91/127, wherein 127C is the total capacitance (64C+32C+16C+8C+4C+2C+1C).

At the same time, the other half circuit takes the analog input "Vinn" (202b) and computes the analog output "Voutn" (Voutn=Vinn*91/127) (206b) in a similar manner.

Figure 1I:
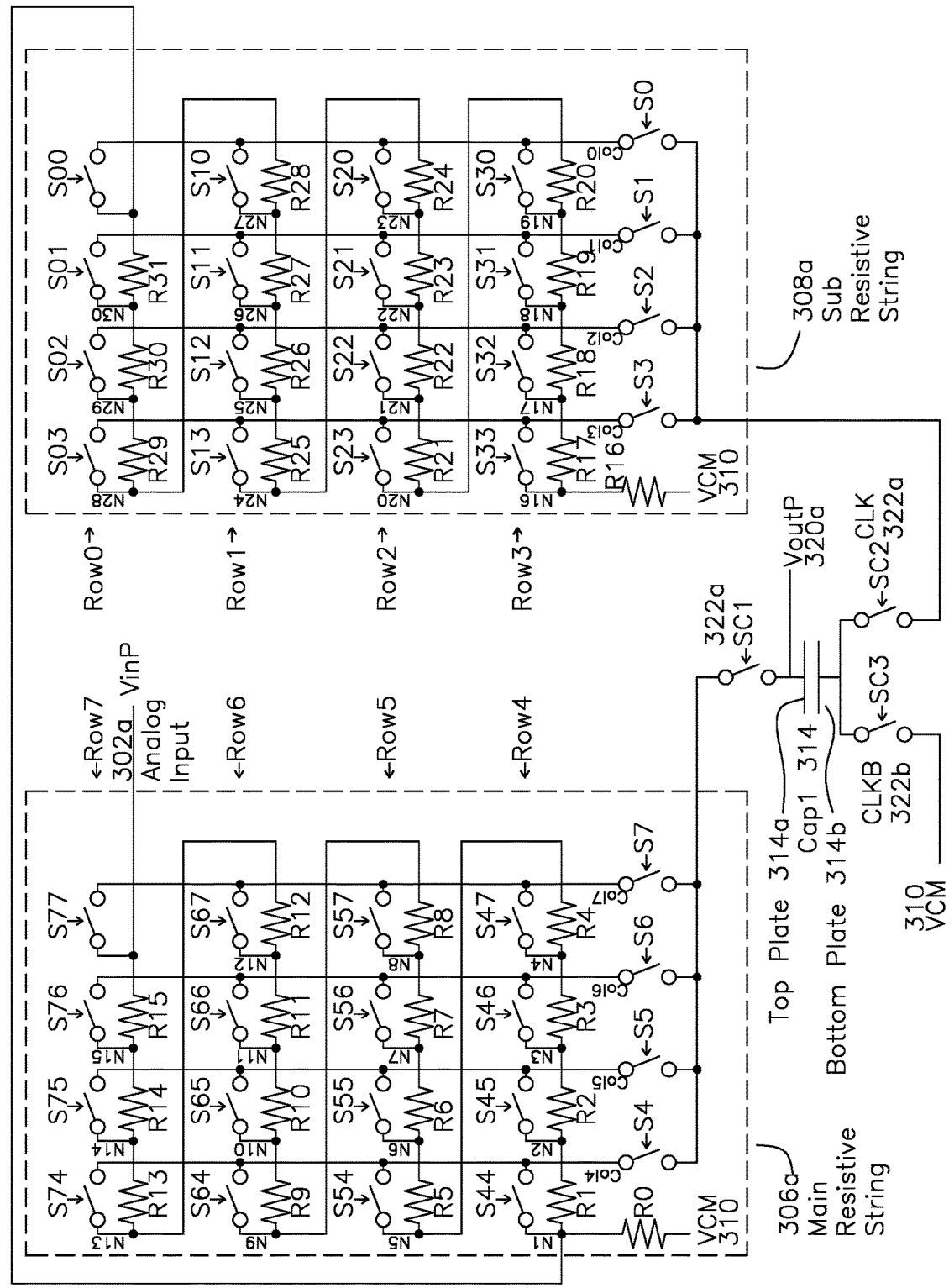
FIGS. 1I and 1J illustrate a schematic diagram of resistive string-based multiplier using resistors, in accordance with an embodiment of the present invention.
Figure 1J:
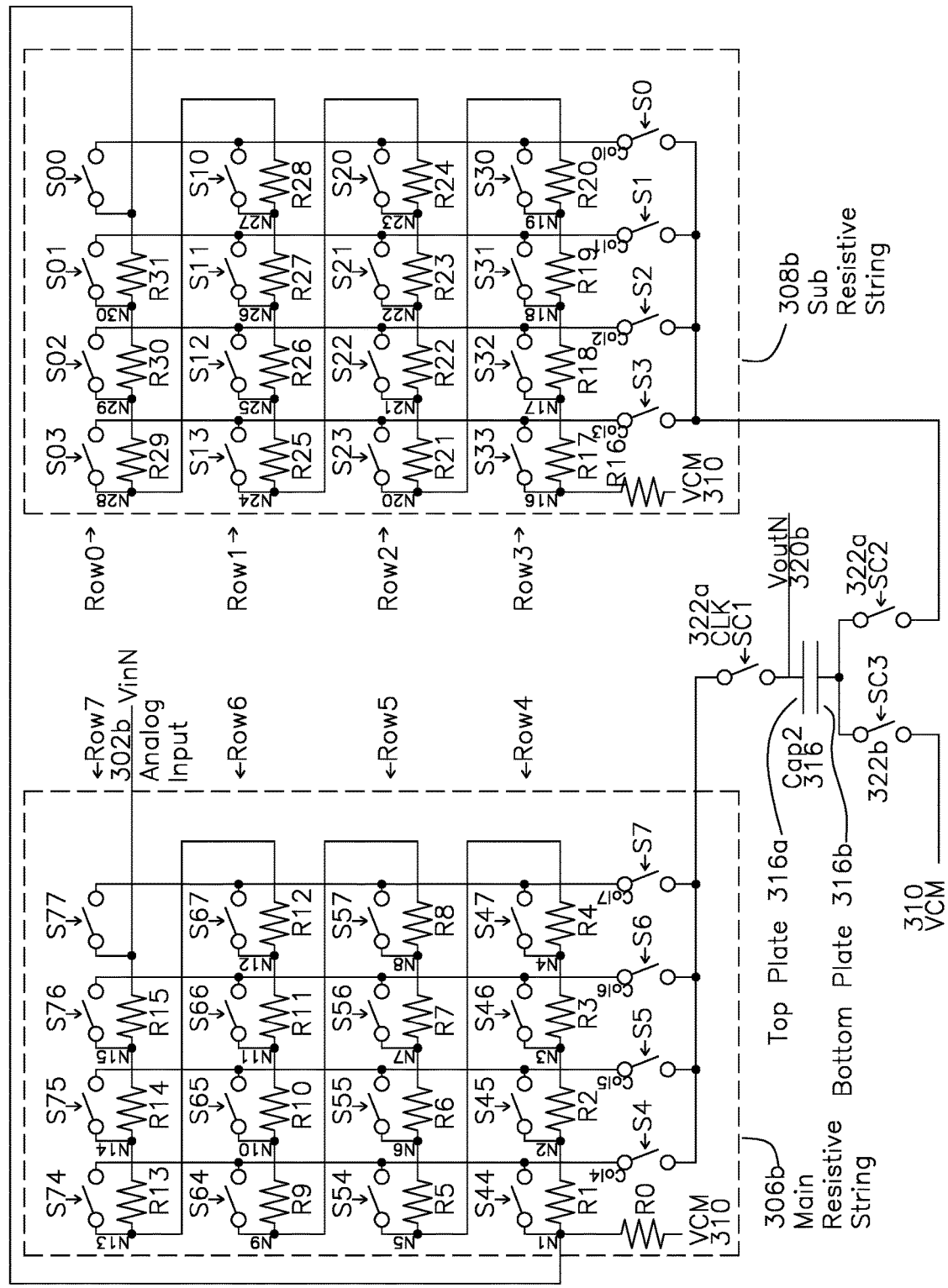
Figure 1L:
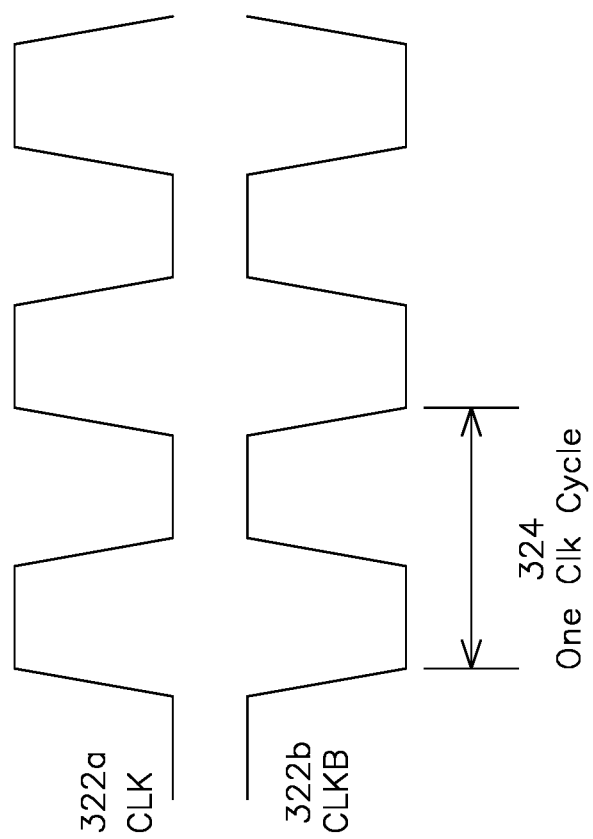
FIG. 1L shows a clock waveform plot.

FIGS. 1I and 1J illustrate the schematic diagram of resistive string-based multiplier using resistors (300), in accordance with an embodiment of the present invention. As shown in the figures (300), the differential version of the 8-bit resistive string multiplier comprises of two main resistive strings (306a, 306b), two sub resistive strings (308a,308b), four decoders (312a,312b;312c,312d), switching mechanisms (S00 to S77) and two capacitors (314,316).

Each of the main resistive string 306a (or 306b) comprises of 16 resistors (R0 to R15) and divide the input voltage Vinp (or Vinn) into 16 distinct values from 0 to input voltage vinp (or vinn) (302a/302b) with step vinp/16 (or vinn/16). Each of the sub resistive string 308a (or 308b) comprises of 16 resistors (R16 to R31) and divide the vinp/16 (or Vinn/16) value of the main resistive string voltage 306a (or 306b) into again 16 distinct values with step vinp/256 (or vinn/256).

Figure 1K:
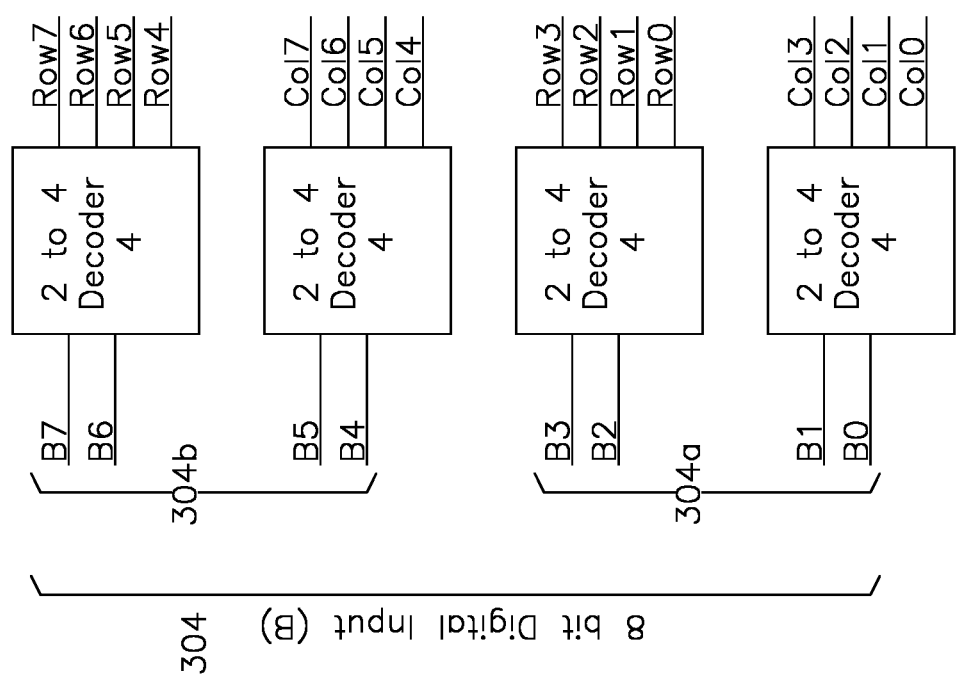
FIG. 1K shows decoders for use with FIGS. 1I and 1J.

FIG. 1K shows a block diagram of coefficient 8 bits (B) (304) sub divided into four most significant bits (4 MSBs) (304b) and four least significant bits (4 LSBs) (304a). Based on the 4 MSB (304b) values, during the "ON" period of the CLK (322a), one of the node voltage of the main resistive strings 306a (or 306b) is sampled on the top plate 314a (or 316a) of the capacitor 314 (or 316) through a first clock switch (SC1 322a). Similarly, based on the 4 LSB values, during the "ON" period of the CLK (322a), one of the node voltage of sub resistive strings 308a (or 308b) is sampled on the bottom plate 314b (or 316b) of the capacitor 314 (or 316) through a second clock switch (SC2 322a). The first clock switch (SC1 322a) and the second clock switch (SC2 322a) are closed during 'ON' period of the clock. The switches (S00-S03,S10-S13,S20-S23,S30-S33,col0,col1,col2 and col3; S44-S47,S54-S57,S64-S67,S74-S77,col4,col5,col6 and col7;) and decoders (312a,312b;312c,312d) for their control are arranged, to maintain the voltage across the capacitor, proportional to the product of input voltage (vinp or vinn) (302a,302b) and the digital coefficient (B) (304). The third clock switch (SC3 322b) is closed and the bottom plate of the first capacitor is connected to the common mode voltage during "off" period of the clock such that the analog voltage output is available at the top plate of the capacitor, which is proportional to the product of input voltage (vinp or vinn) (302a,302b) and the digital coefficient (B) (304). The 8-bit width for digital input is taken or mentioned here for explanation purpose only. However, the present invention is also applicable to n-bit width.

During the "ON" period of the CLK, the bottom plate 314b (or 316b) of the capacitor 314 (or 316) gets connected to common mode voltage (VCM) (310) and also the top plate 314a (or 316a) voltage is available as an output voltage.

Hence, the output voltage 320a (or 320b) of the Multiplier is proportional to the product of input voltage Vinp (or Vinn) and the digital coefficient (B) (304). For example, if vinp=400 mV, Vinn=0V, Vcm=200 mV and B=10101001$_{(2)}$ then during the positive half cycle of CLK/ the "ON" period of the "ph1" CLK, 24 the capacitor C1 top plate gets a voltage equlal to 1011$_{(2)}$*(vinp−Vcm)/16 (i.e., 11*(Vinp−Vcm)/16 and the bottom plate capacitor gets the voltage equal to (1111$_{(2)}$−1001$_{(20}$−1)*(Vinp−Vcm)/256 (i.e., 5*(vinp−vcm)/256). Finally, the difference between the two plates voltage is equal to 10101001$_{(2)}$*(Vinp−Vcm)/256. The differential output, Vout is equal to vin*B/256. The operation of the circuit explained hereinabove with respect to the positive side input and output signals Vinp and Voutp. The present system multiplies the vinp and Vinn analog input signals with the digital coefficient (B) and produces analog outputs Voutp and Voutn respectively.

Advantages:

1. One multiplication and addition operation is performed within one clock period. Hence the circuit is faster for a specific power.

2. No pipelined operation is performed in the circuit and hence no latency at the output.

3. Each DAC and ADC are shared by multiple PE cells.

4. Number of DACs and ADCs used in the present invention are equal to number of rows ("m") and columns ("n") in the PE matrix respectively.

5. The present invention is scalable to different operating clock speeds, different input and output sizes.

6. In the capacitor-based multiplier, the input sampling and reset of capacitors are performed in the same clock cycle.

7. No extra cycle is required to reset the capacitors.

8. The charge stored on the capacitors is partially reused in the next multiplication cycle, so that the energy required to charge the capacitors in the next computation cycle is reduced. Hence additional power saving is achieved.

9. The resistor-based multiplier generates fully monotonic output.

Switched Cell Example of the Dot Product Multiplier.

Reference numbers previously used with respect to the resistor cell multiplier of resistive cell figures 1A, 1B, 1C, 1D, 1E, 1F, 1G, 1H, 1I, 1J, 1K, and 1L relate to the same structures in that series of figures only.

The switched cell dot product multiplier is a distinct invention in the same field and described in various embodiments in switched cell figures 2A, 2B, 2C, 2D, 2E, 2F, 2G, 3A, 3B, 4A, 4B, 5, 6, 6-1, 6-2, 6-3, 7, 8A, 8B, 8C-1, 8C-2, 8C-3, 8C-4, 8D, 9A-1, 9A-2, 9B-1, 9B-2, 9B-3, 9C-1, 9C-29D-1, 9D-2, 9E, 10, and 11 with similar reference numbers do not refer to the resistive cell figures, but are only with respect to the switched cell figures, where identical reference numbers are for the same structure.

Figures 2A, 2B:
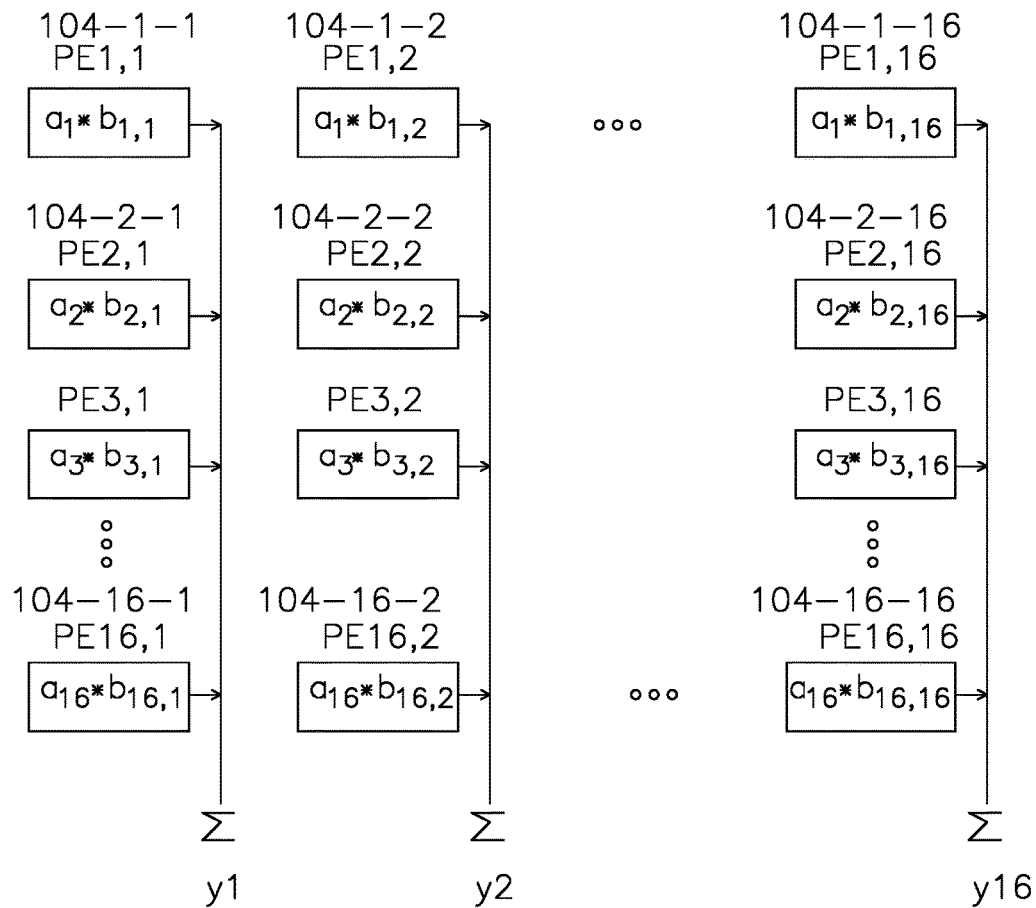
FIG. 2A shows the dot product multiplication of a matrix A (a 1×16 vector matrix) with matrix B (a 16×16 matrix) to generate the result Y (a 1×16 vector dot product).
FIG. 2B is a block diagram of a 16×16 array of processing elements (PE) with corresponding B coefficients to form the dot product operation of FIG. 1.
Figure 2C:
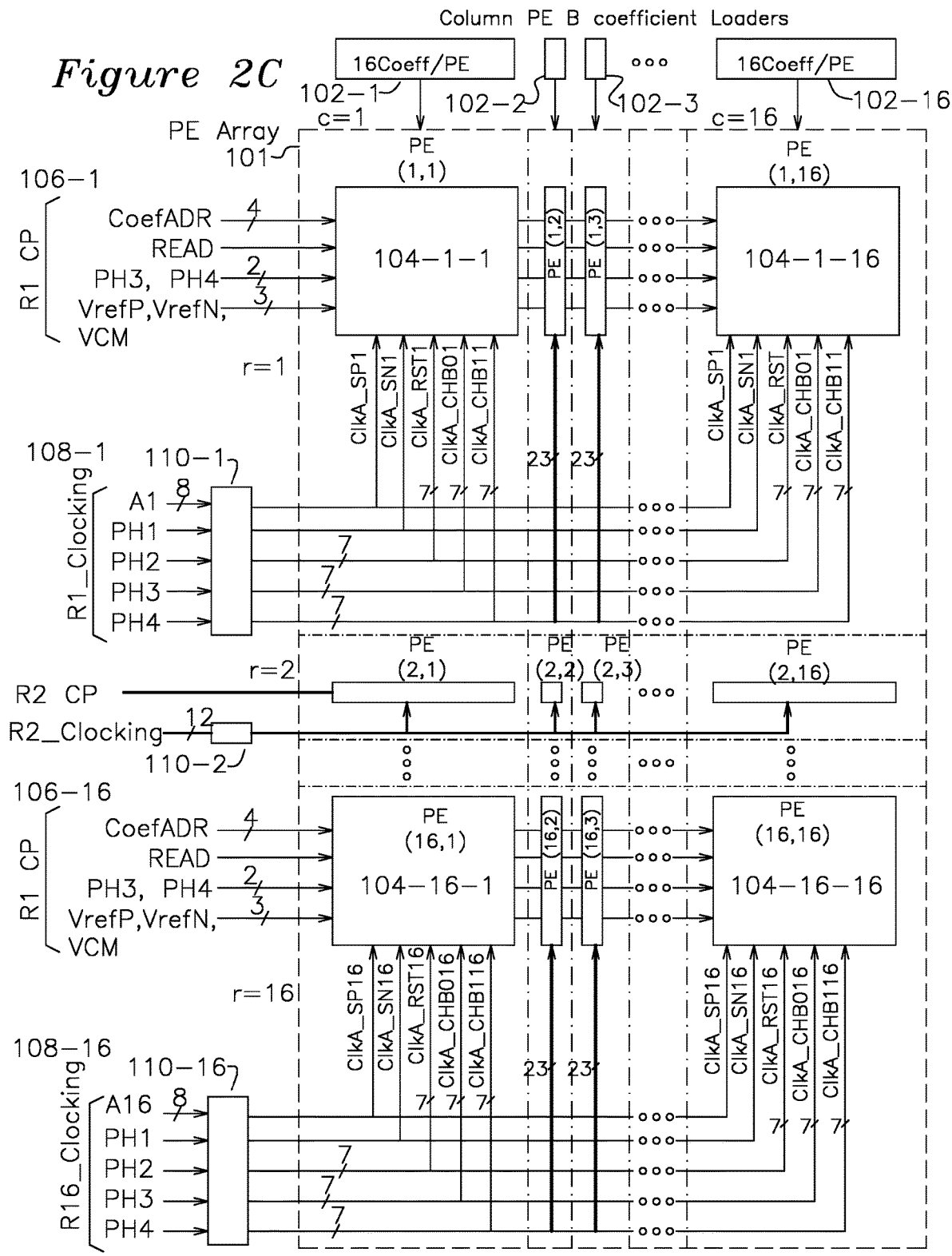
FIG. 2C is an overall block diagram of the dot product Multiply Accumulator (MAC) showing the 16×16 array of PE cells and input connections to the PE cells.

FIG. 2A shows a dot product multiplication example for an A matrix of 1×16 dimension with a B matrix of 16×16 dimension. FIG. 2B shows an example array of processing elements (PE) 104-c-r (where c=column and r=row) to perform the dot product multiplication of FIG. 1, where the output of each PE is summed in columns to form the output result Y. FIGS. 2C and 2D show an expanded block diagram of FIG. 2B for a dot product multiplier accumulator (MAC) according to an example of the present invention. For simplicity, an example 16×16 dot product MAC is shown, although the present invention may be scaled to larger or smaller size by the mere addition or subtraction of PE columns (noted as c) or rows (noted as r). The cells of FIG. 2B use a modified matrix index notation, with the first suffix indicating column (c) and the second indicating row (r), so a PE cell 104 is replicated as 104-1-1 through 401-1-16 along row 1, and 104-16-1 through 104-16-16 along row 16. The B matrix need not be a square matrix, it only need have the same number of rows as the A matrix has columns.

Each of the PEs along a particular row receives row clock signals from row clocking generators 110-1 serially encoded with A matrix for row 1, 110-2 for row 2, through 110-16 for row 16. The row signals are distributed commonly to each PE on a particular row.

Each element of the A and B matrices are in the form of an MSB sign bit followed by an unsigned integer, for the 8 bit values in the present example, [Sign(b7)][b6 . . . b0], lower case b indicating a binary value and the number following indicating the bit position, with b0 being the least significant bit.

Each of the column PEs 104-1-1 through 104-16-1 and 104-1-16 to 104-16-16 are initially loaded with a corresponding matrix B (as shown in FIG. 2B) with coefficient values provided by coefficient loaders 102-1, 102-2, 102-3, to 102-16. The coefficients loaded into each PE 104-1-1 through 104-16-16 are associated with the corresponding element of the B matrix (as shown in FIG. 2B), and comprise the individual 8 bit values of the elements of the 16×16 B matrix associated with a particular PE.

FIG. 2D shows the output connections for the PE array 102. The column outputs of each PE are respectively coupled to output 180-1, 180-1, through 180-16, and each of the PEs contribute charge at each output cycle to each output line 180-c at the end of each cycle, after which the respective accumulators 182-1, 182-2, 182-3 through 182-16 provide outputs to analog to digital converters (ADC) 184-1, 184-2, through 184-16.

Figure 2E:
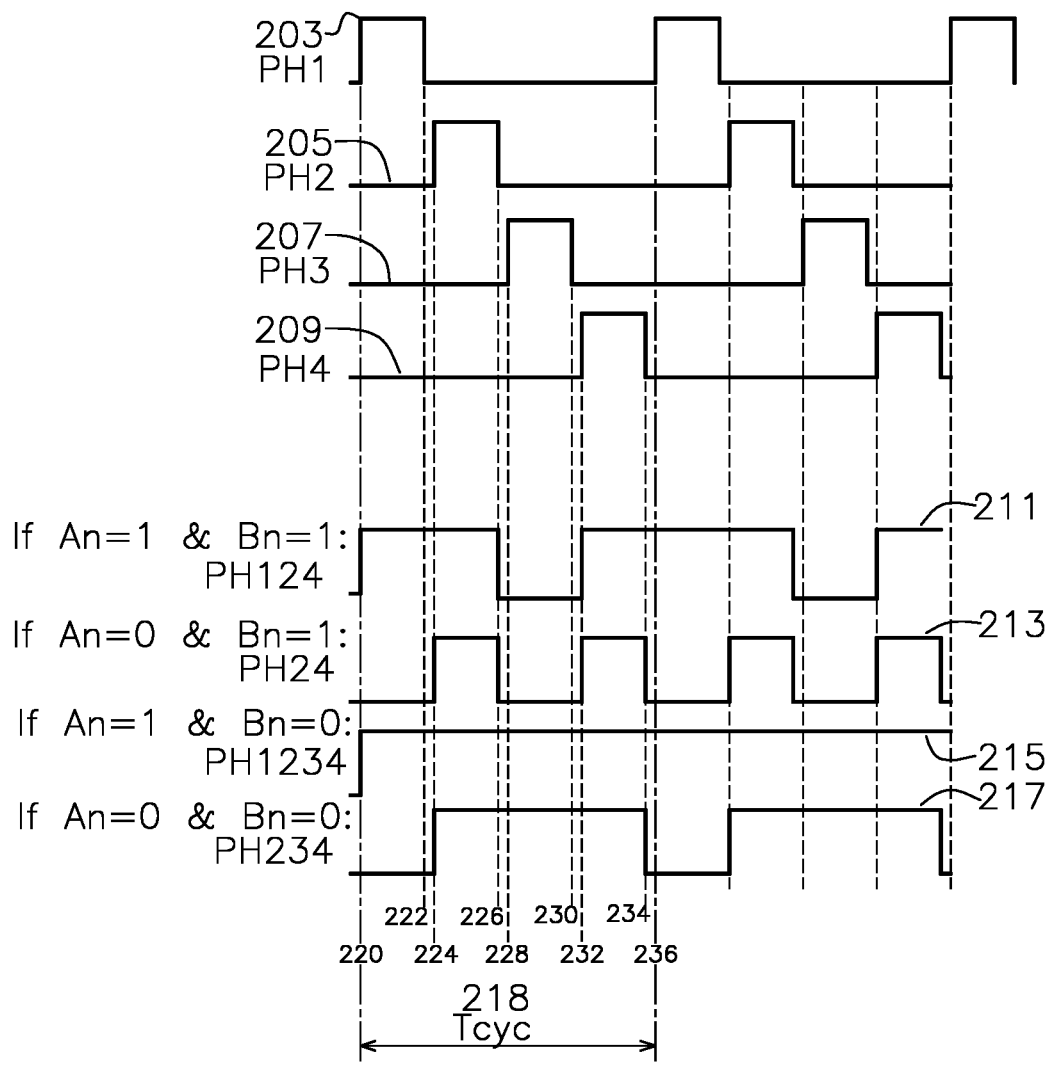
FIG. 2E shows waveforms for the four phase clock generator with reference to a single computation cycle Tcyc.

FIG. 2E shows the waveforms for the four phase clock generator, phase 1 (PH1) 203, phase 2 (PH2) 205, phase 3 (PH3) 207, and phase 4 (PH4) 209, as well as waveforms derived from the clock phases. The clock phases are used to switch various PE and row clocking elements. Each of the individual clock phases include a "dead" zone between clock transitions, such as the intervals from 222 to 224, 226 to 228, 230 to 232, and 234 to 236, which repeat each clock cycle. The four clock phases are combined by the row clocking controller 110 based on bit values of elements of matrix A (from the row clocking controllers) and B addresses to the PEs, whereas the various row signals PH124 211, PH24 213, PH1234 215 and PH234 217 indicate the clock signals used in internal PE cell operations, where the A value modifies the clock active phases distributed to the PEs, and the waveforms 211, 213, 215, 217 show the four different clocking results, which are annotated in the PE cell of FIG. 6A.

Figure 2F:
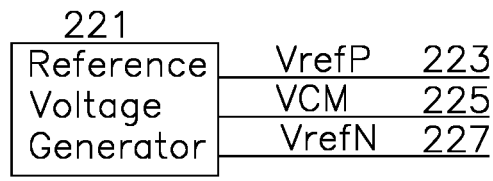
FIG. 2F is a reference voltage generator for generating the DC voltages used by each PE cell.

FIG. 2F shows a block diagram for a reference voltage generator 221 which generates DC voltages VrefP 223, VCM 225, and VrefN 227. These reference voltages are used to determine the sign and magnitude of voltage applied to each PE capacitor C, where each C has a value that is a factor of 2 related to bit position so as to store charge related to significance of the bit position. This stored charge of each bit operation is later transferred by each PE to the accumulator during PH4 at the end of each clock cycle. In general, VrefP>VCM>VrefN, and in one example of the invention, VCM=(VrefP+VrefN)/2.

Figure 3A:
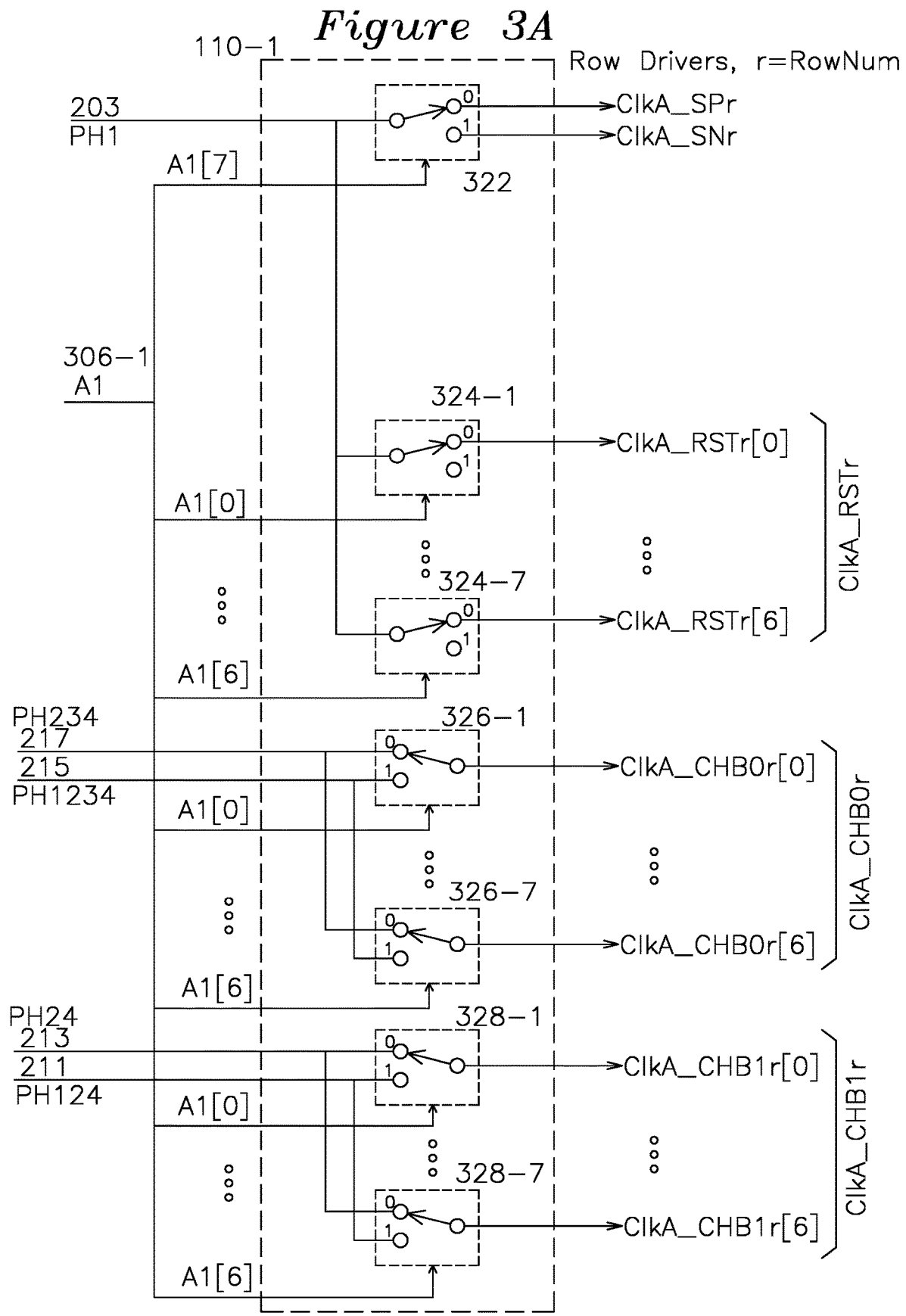
FIG. 3A is a block diagram showing an example row clock driver of FIG. 1A.

FIG. 3A shows row clocking generator 110-1, which is shown for each row in FIG. 2C as 110-1, 110-2, to 110-16. Each row driver 110 uses clock phases PH1 203, PH1234 215, PH124 211, PH234 217, and PH24 213 of FIG. 2E in combination with address bits a[0:7] as shown. The row clocking generator contains analog switches 322, 324-1 to 324-7, 326-1 to 326-7, and 328-1 to 328-7, which provide a low resistance connection in response to an actuating voltage, and the individual switches may be formed from CMOS FET transistors, NMOS FET transistors, or other types of electronic switch elements controllable by an external input. In the present example, switch 322 selects the output indicated with "1" (sending PH1 to CLKA_SNr) when a1 [7] is asserted, and selects the 0 output (sending PH1 to ClkA_SPr) when a1 [7] is not asserted. Switches 324-1 to 324-7, 326-1 to 326-7, 328-1 to 328-7 perform the same associated function with the bit positions 0 to 6 to generate, respectively, ClkA_RSTr[0] through ClkA_RSTr[6], ClkA_CHB0r[0] through ClkA_CHB0r[6], and ClkA_CHB1r[0] through ClkA_CHB1r[6]. In these examples, r is the associated row number receiving the clock signal, for example, for r=0, all of the 110 driver signals are sent to row 0.

Figure 3B:
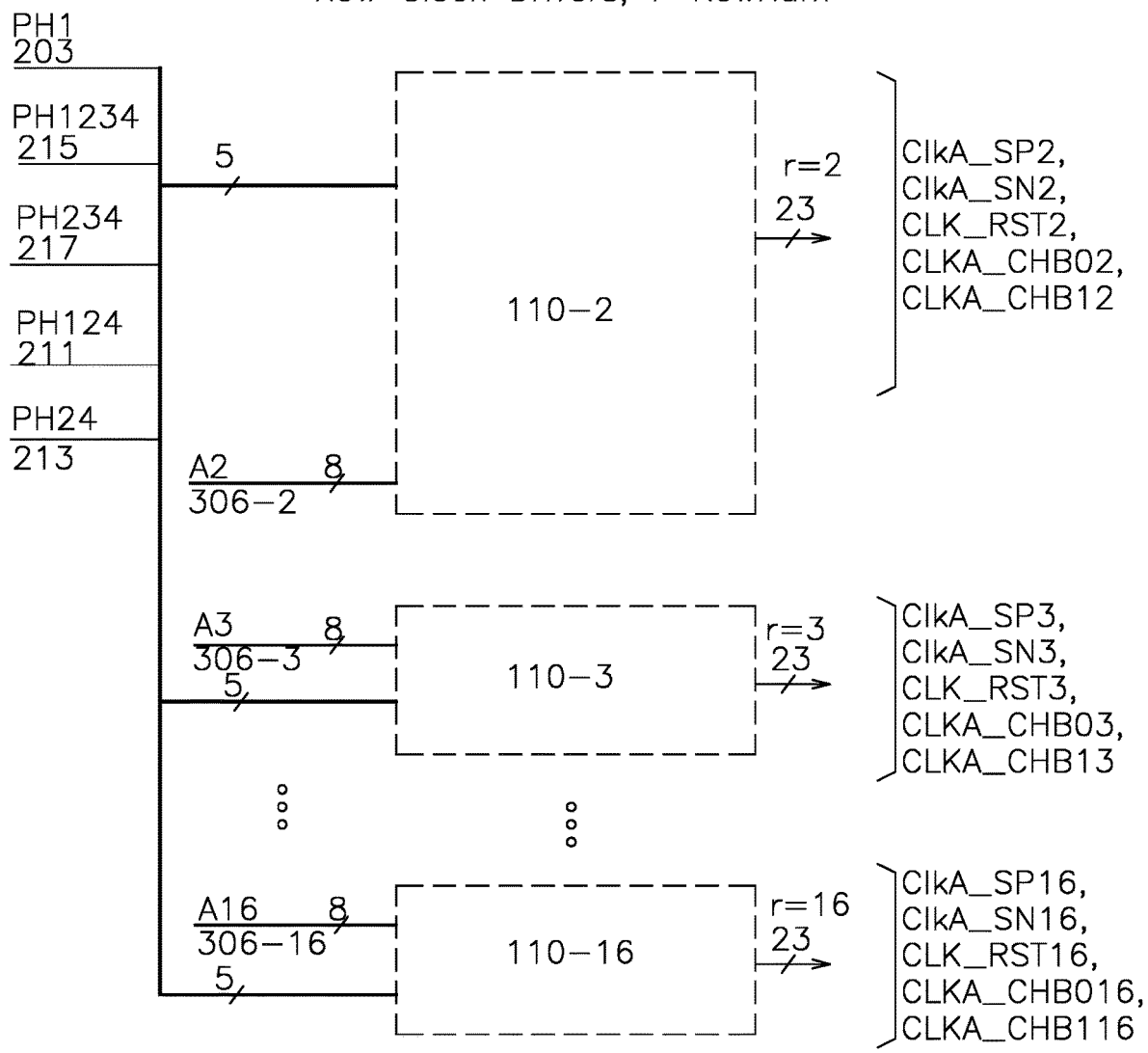
FIG. 3B is a block diagram showing the remaining row clock drivers for the PE array of FIG. 1A.

FIG. 3B shows the remaining row clock drivers 110-2 through 110-16 in summary form, each of which represents the interconnected elements of FIG. 3A, and follow the assignment of the A vector indicated in FIG. 3A.

Figure 4A:
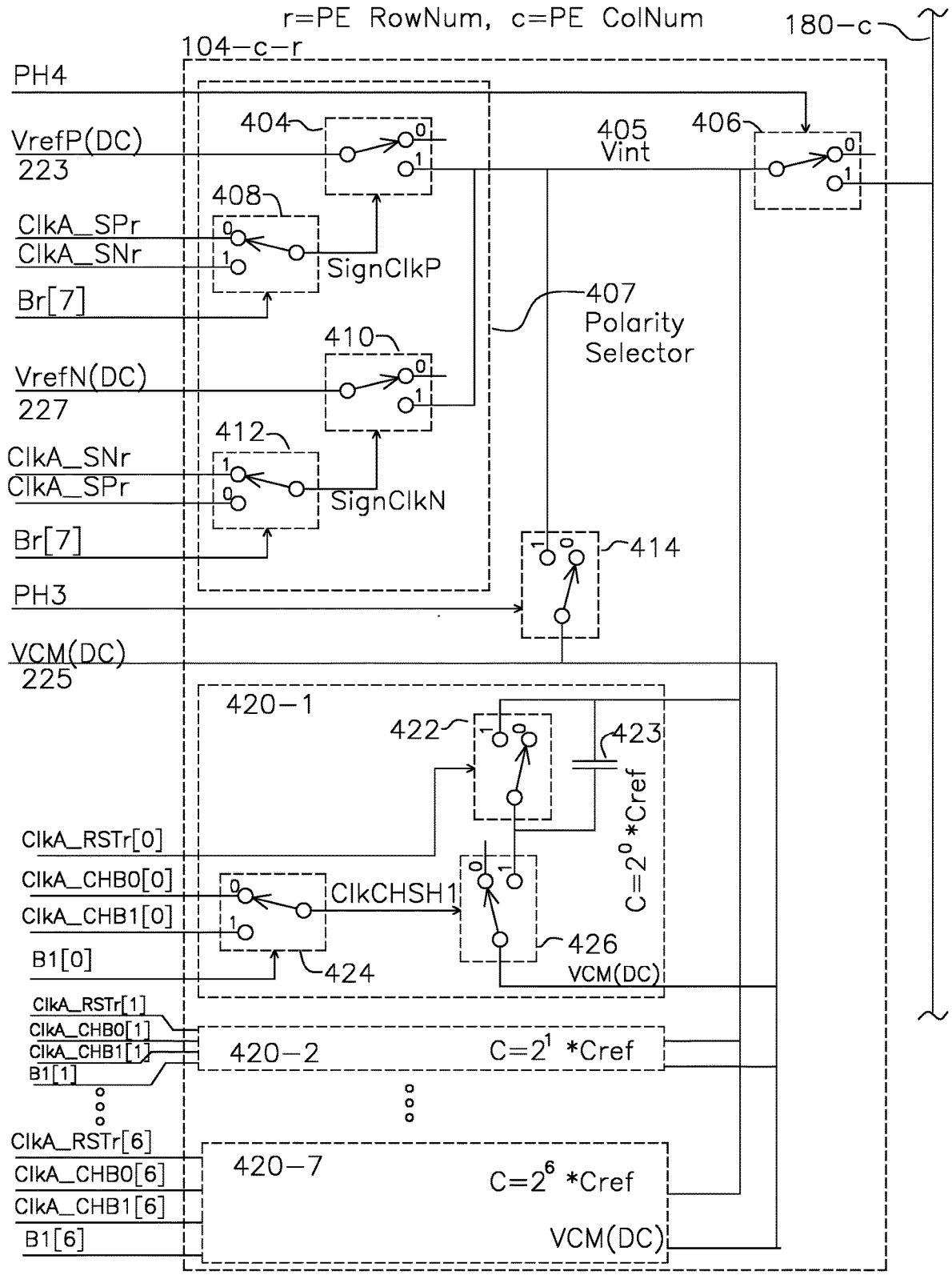
FIG. 4A is a block diagram showing the components of a Processing Element (PE) cell.

FIG. 4A shows a Processing Element (PE) cell 104, used in each of the PEs of FIG. 2B such as 104-1-1, etc. Each PE 104 receives PH4 which enables output switch 406 during the final phase. Switches 404, 408, 410, and 412 form connections to reference voltages VrefP 223, VCM 225, and VrefN 227 through switches 404, 410, and are controlled by the selected PE sign bit $b_r[7]$, and Vint 405 is connected to VCM 225 on each phase 2 PH2 clock cycle. The PE multipliers 420-1 through 420-7 each perform the multiplication on bits 0 to 6 of respective A and B bits, transferring a positive or negative voltage to a capacitor C 423 in each multiplier during a first phase based on a sign bit and a coefficient, by connecting the positive reference (VrefP) or negative reference (VrefN) to capacitor C on each multiplier 420-1 through 420-7 on the first phase PH1 of the clock, where each multiplier 420-1 to 420-7 capacitor C 423 has a capacitance equal to Cref*$2^n$, where n is the corresponding bit location of the associated multiplier, with n=0 being the least significant bit (LSB) 420-1 multiplier and 6 being the most significant bit (MSB) 420-7 multiplier, and the 7th bit being the sign bit of the sign and magnitude format described earlier. The PE is shown for 8 bit element values (sign+7 bit value) for clarity in the example, however the present technique works for any number of bits forming each A and B matrix element.

The multiplier cell 420-1 receives signals ClkA_RSTr[0], ClkA_CHB0 [0], and coefficient B1 bit 0, with each of the other multipliers 420-2 through 420-7 performing the parallel multiplication operations by transferring charge to the corresponding C 423 of each cell during a first phase PH1, sharing multiplier cell charges in a second phase PH2, each multiplier cell zeroing out a respective capacitor charge of its corresponding bn=0 during a third phase, with the resultant charge transferred through output switch 406 to the common output line 180-c of all multiplier capacitors for a particular column c to the accumulator during a fourth phase PH4. In one example of the invention, the VrefP charges and VrefN charges are connected to separate output lines (such as differential lines) 180-C(+) and 180-C(−), respectively.

Figure 4B:
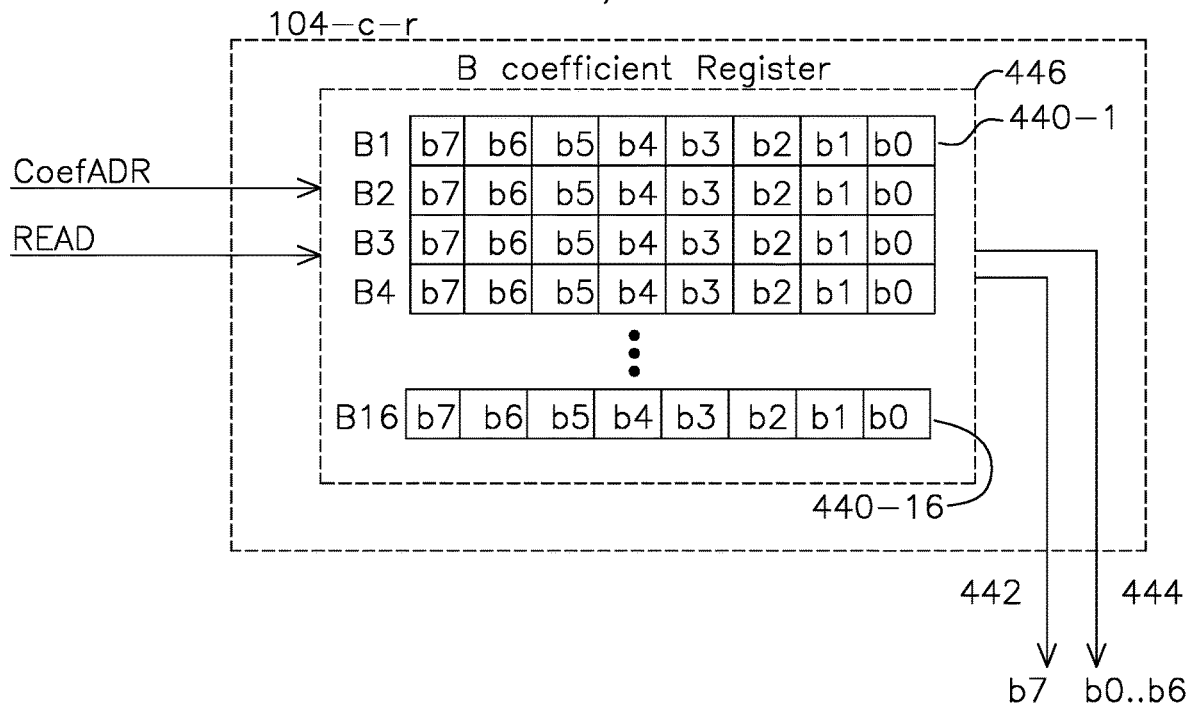
FIG. 4B is a block diagram showing the coefficient register of a PE cell.

FIG. 4B shows the PE cell 104-c-r with B coefficient register 446, which has 8 bit values B1 440-1 through B16 440-16 corresponding to the values of PE cell 104-c-r as shown in FIG. 2B. The B coefficient register is pre-loaded with the coefficients of the associated B vector before the PE multiply clock phases PH1 to PH4 begin operation. During operation, each multiplier 420-1 through 420-7 of a PE takes its associated bit slice of linear array of [B16 . . . B1], shifts the sign bit b7 442 and sequentially values b0 to b6 (output 444) in sequence to the PE multiplier 420-1 to 420-7.

Figure 5:
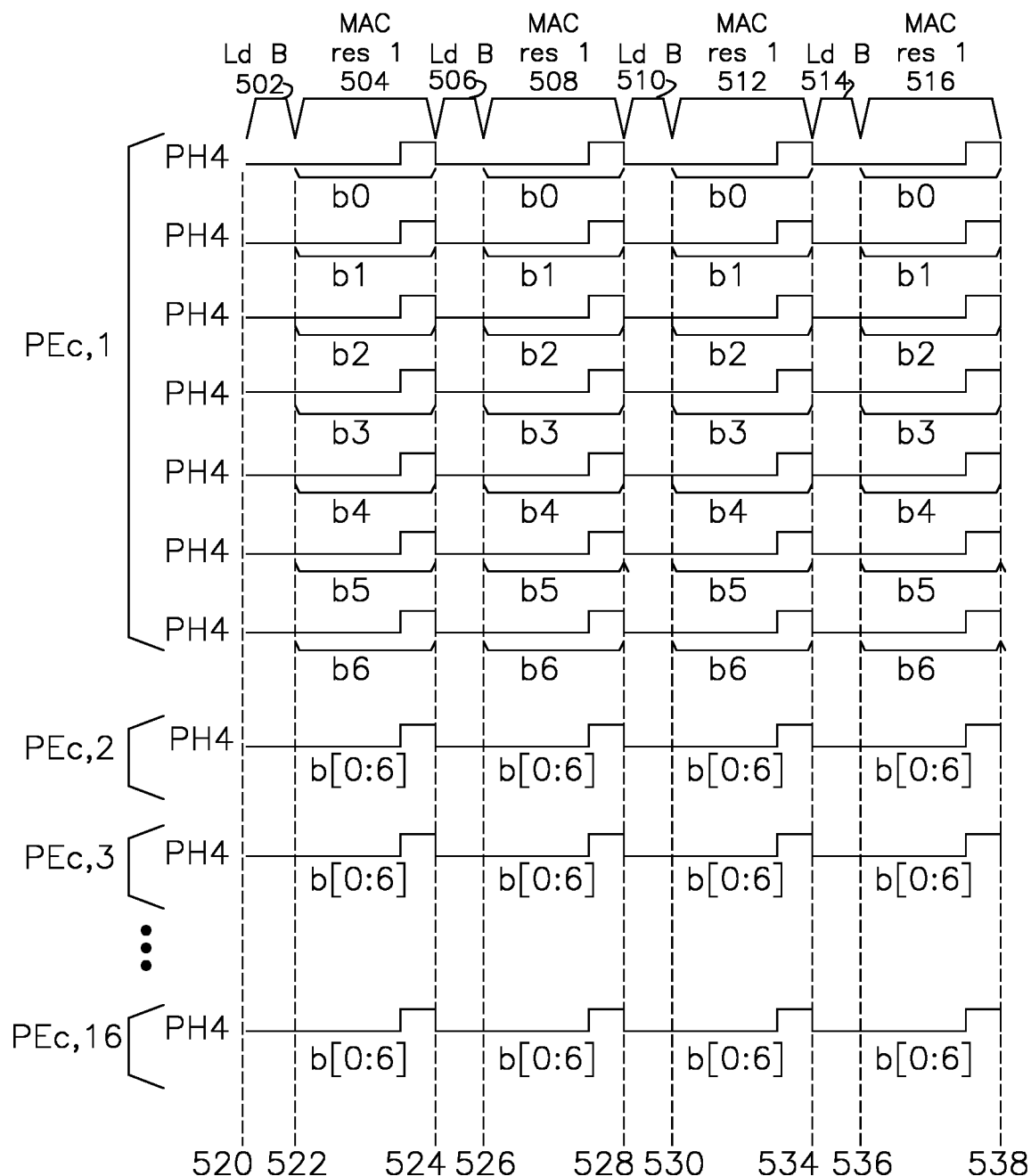
FIG. 5 is a timing diagram showing the sequence of computation of a 16×16 multiplication contributed by a single PE to the accumulator.

FIG. 5 shows a timing diagram for the operation of the entire MAC. Clock PH4 is shown for reference, and each cycle starts with loading the PE B registers at 502 from time 520 to 522, followed by the dot product computation 504 which is output at the PH4 until 524, during which time each of the PEs ties together the respective capacitor C 423 of respective multipliers 420-1 through 420-7 and outputs to 180-c for all PEs to generate the summed charge output across all of the columns to generate the dot product output at time 524. The process repeats for each dot product computation, with the B register load 506 from 524 to 526, dot product computation 508 from 526 to 528, the process repeating for B register load 510 from 528 to 530, MAC 512 from 530 to 534, load 514 from 534 to 536, and dot product computation 516 from 536 to 538.

In an example embodiment, the positive charges and negative charges (either VrefP-VCM or VrefN-VCM) for each PE column are transferred in separate accumulator lines 180-c(+) and 180-c(−) so that discontinuous current flow between positive voltages (VrefP) and negative voltages (VrefN) does not occur creating resistive interconnect loss of charge in the capacitors. The sign value is presented as VrefP/N to indicate the charge may be positive or negative, that is, the capacitor C 423 may be charged to a voltage above (VrefP-VCM) or below (VCM-VrefN) VCM. At the end of each clock cycle, the charge transfer process continues for each dot product computation across all PEs.

Figure 6:
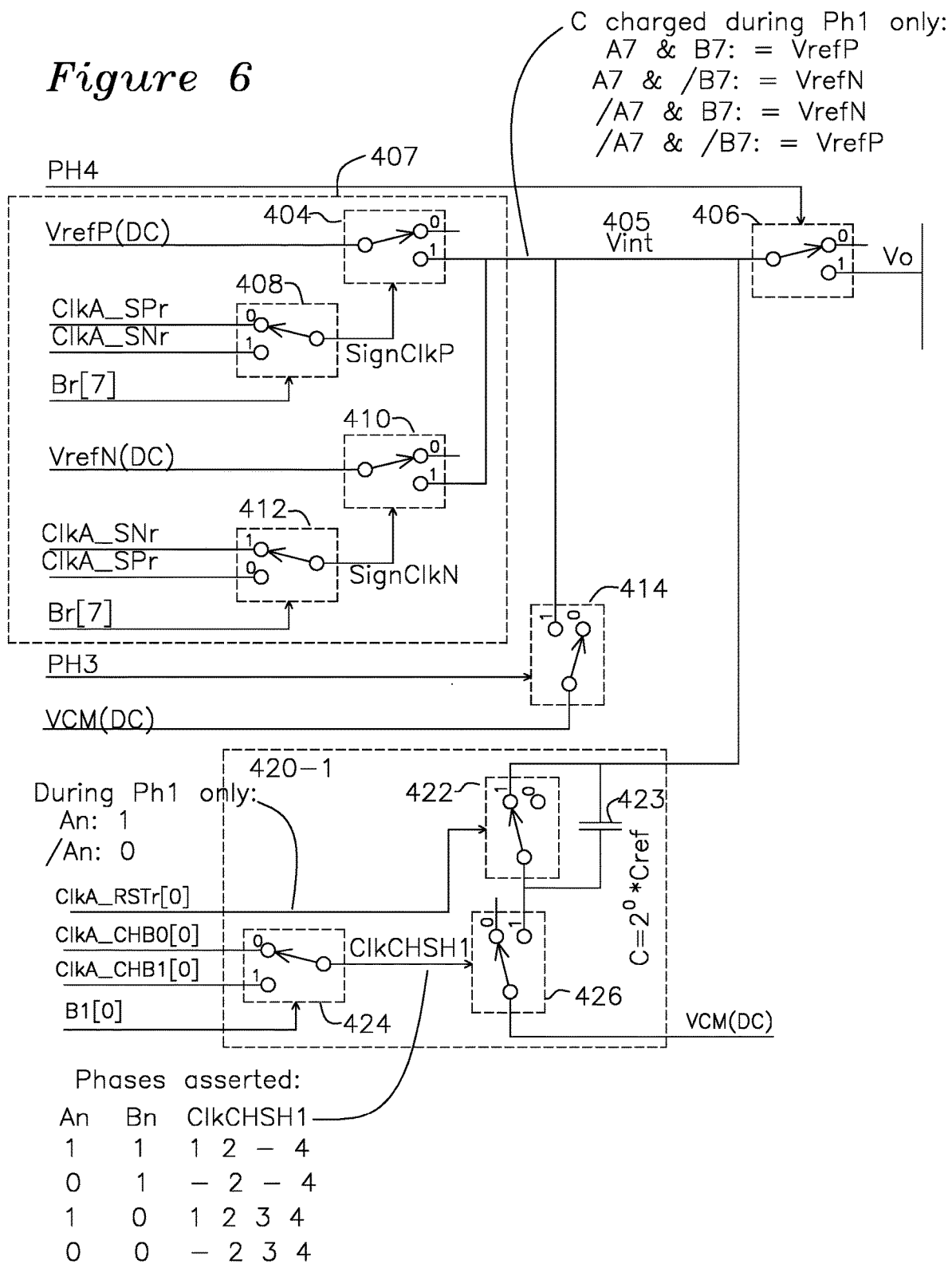
FIG. 6 is an annotated version of FIG. 4C showing operation during each of the four clock phases.
Figures 1, 6:
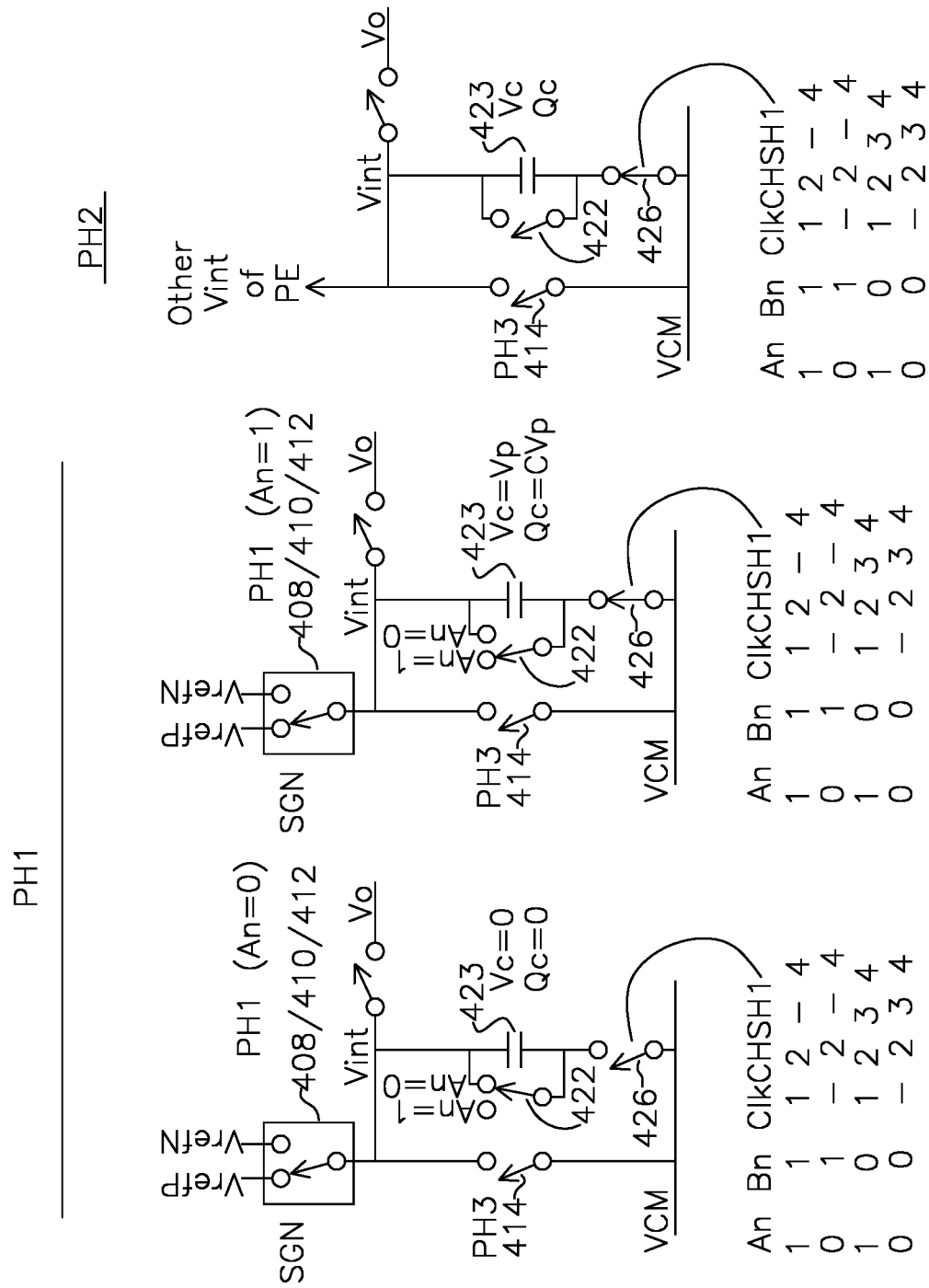
Figures 2, 6:
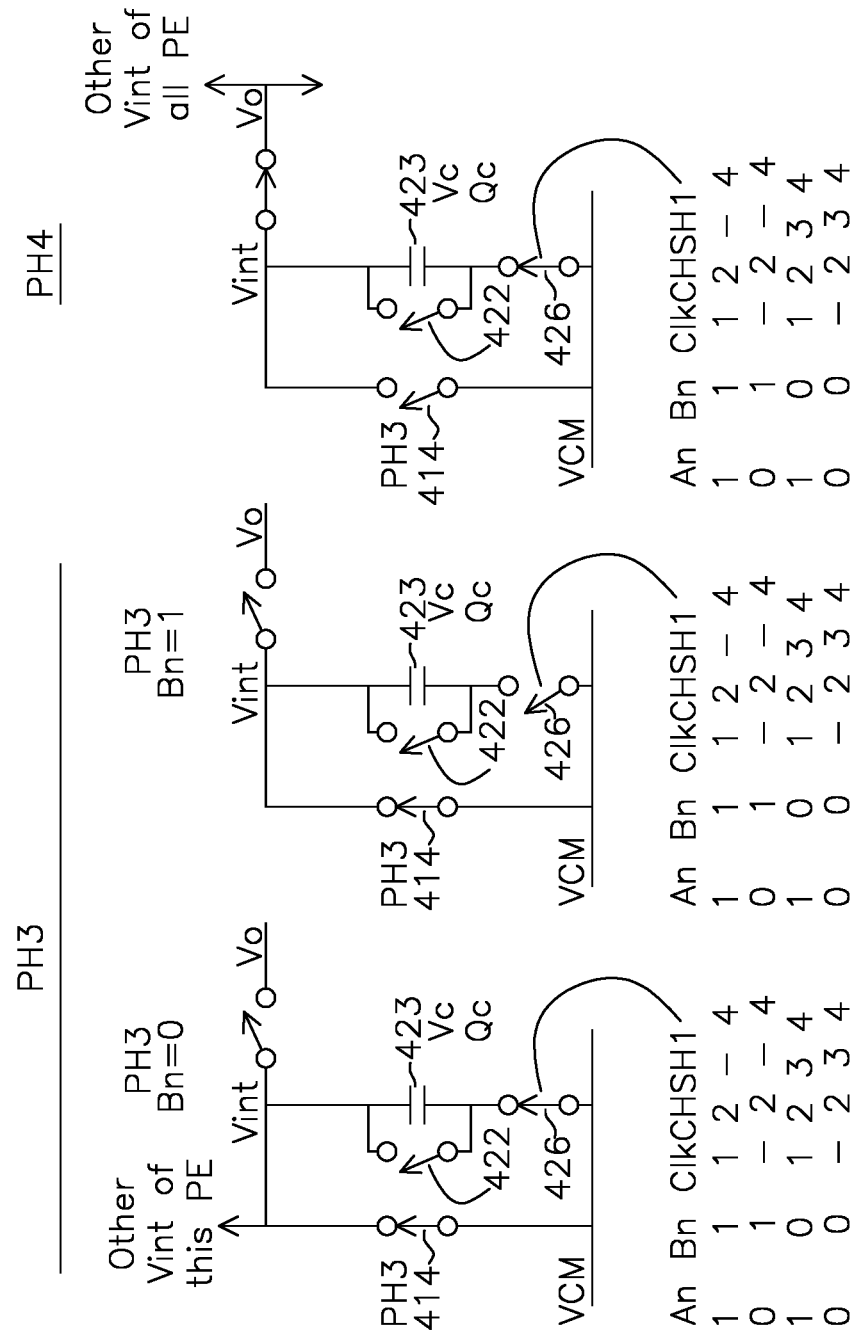
Figure 8A:
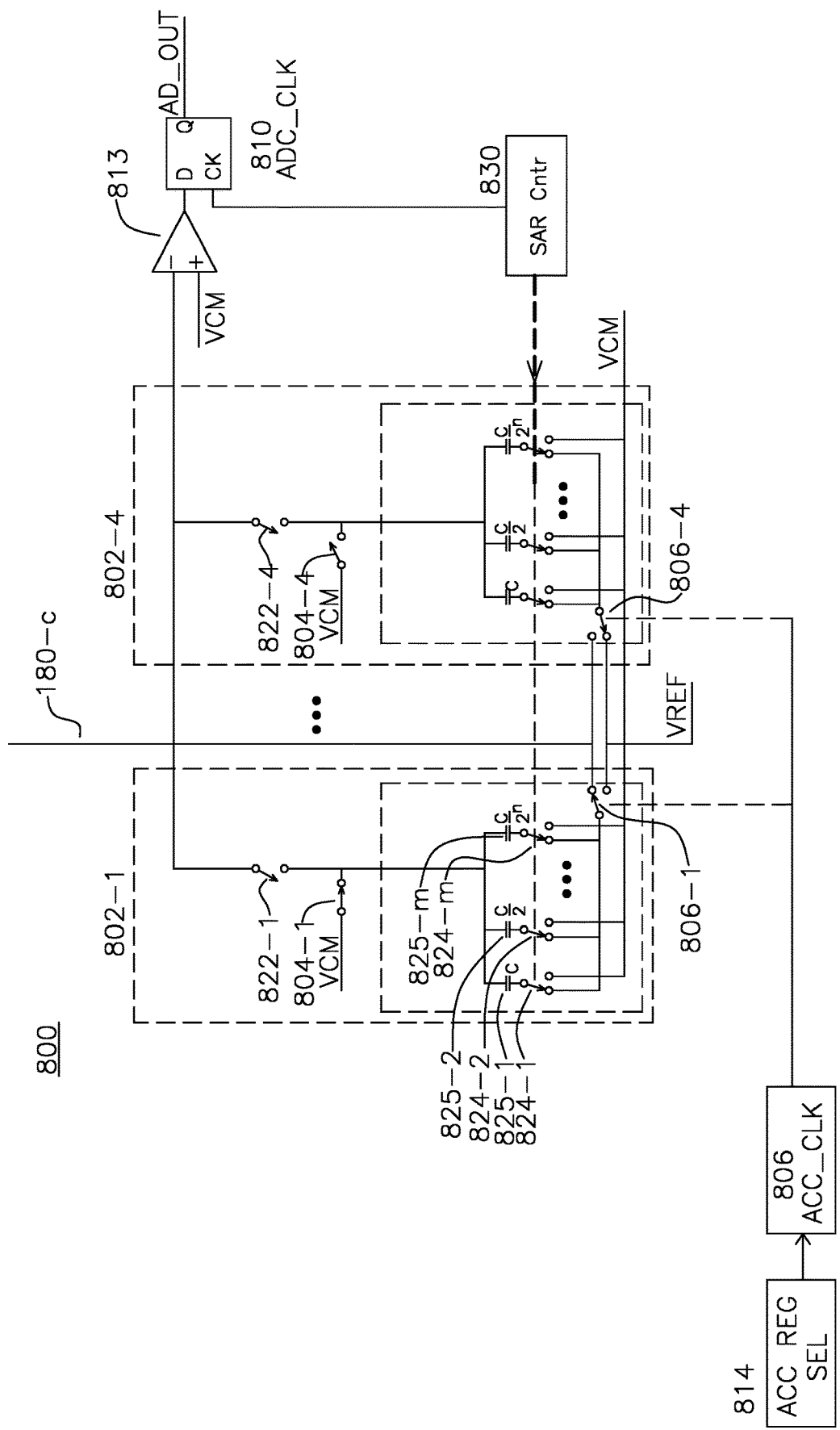
FIG. 8A shows a Successive Approximation (SA) Analog to Digital Converter (ADC) in a sample mode.
Figures 1, 8C:
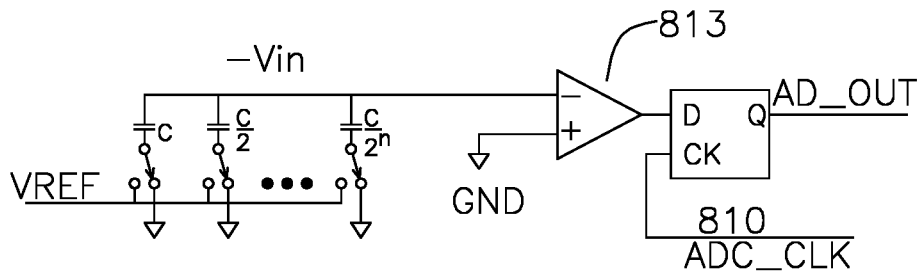
Figures 2, 8C:
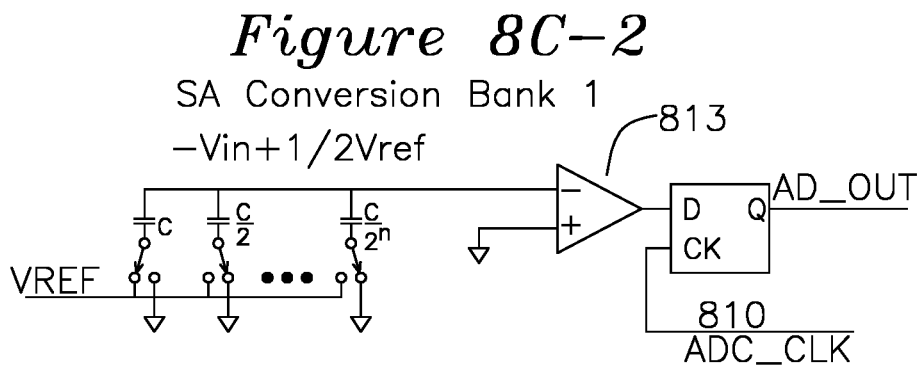
Figures 3, 8C:
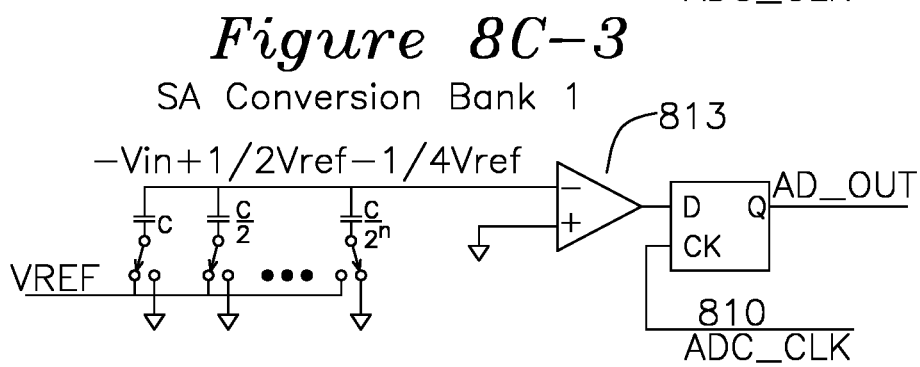
Figures 4, 8C:
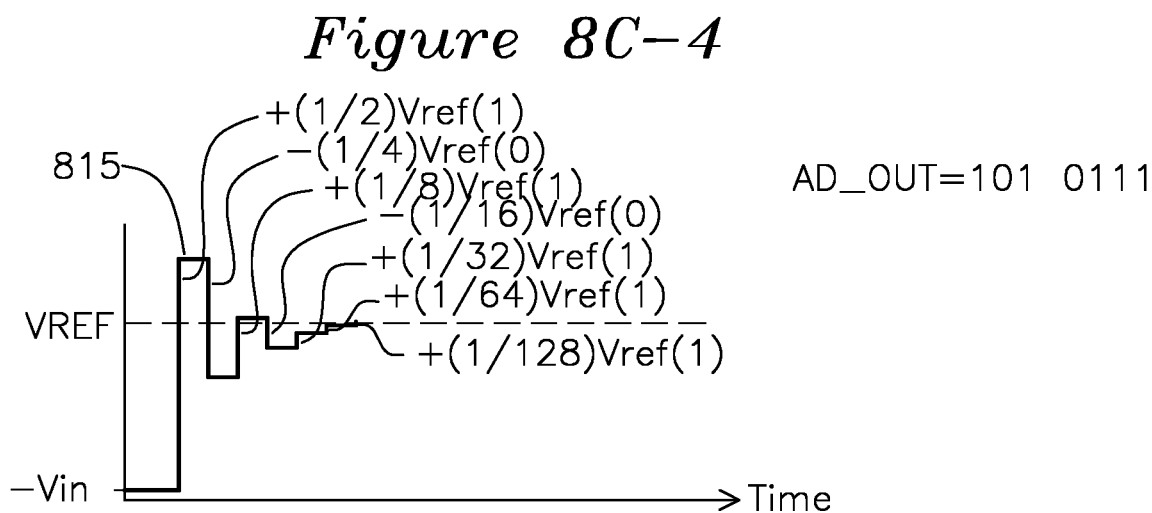

FIG. 6 shows the elements of a single PE of FIG. 4 with a single multiplier 420-1, and annotated with particular intermediate results for reference to FIG. 7, showing the state of the capacitor voltage of FIG. 6 at the end of each phase. Additional simplified schematic FIGS. 6-1 and 6-2 show the elements of FIG. 4 which are present and operative for each of the four clock phases, with additional configurations shown for phase 1 dependent on an and phase 3 dependent on $b_n$. FIG. 7 shows a flowchart of operations where the A and B matrix operations are performed by each PE of the 16×16 array of PE of FIG. 2B. Step 720 shows a single PE operating to form a dot product of a column c of matrix A and row r of matrix B.

During the first phase PH1, the sign function 407 establishes the sign of the A and B sign bits for the charge to be delivered in a particular PE, and during PH1, transfers either positive voltage (VrefP−VCM) to capacitor C 423 of 420-1 (and 420-2 to 420-7 shown in FIG. 4A) if both sign bits (MSB) of a and b are 1 or both sign bits are 0, and transfers a negative voltage (VCM−VrefN) to the capacitor C 423 if the sign bits are different. Note that positive and negative voltages are with respect to VCM. The capacitance of the capacitor C 423 is determined by the multiplier 420-n bit number n (where n is in the range {0 . . . 6}), the capacitance C is a factor of 2 greater for each increased bit significant in multiplier 420-1 though 420-7. This is also shown in step 722 based on the MSB of the two coefficients to be multiplied. For the iteration of operations 706 associated with particular multiplication, the capacitance of each multiplier 420-1 through 420-7 capacitor is set 726 as previously described and the operations on all PEs proceed together 724 starting with phase 1 728, where each multiplier 420-1 through 420-7 capacitor C 423 is charged to (VrefP−VCM) or (VrefN−VCM) as shown in step 728.

During the second phase PH2, the PE analog switches reconfigure during PH2 (controlled by the inputs to switch 424) to close switch 426 connecting one end of the capacitor 423 to VCM and connecting in parallel all of the capacitors 423 of other multipliers within each particular PE in step 730, as also shown in FIG. 6-1.

During the third phase PH3, switch 414 closes, and if $b_n$ is zero, switch 422 closes to remove charge from C of the respective multiplier by connecting both sides of the capacitor 423 to VCM through switches 426 and 414. Alternatively, if $b_n$ is 1, switch 426 is open and the capacitor 423 maintains its charge carried from PH2, as shown in step 732, as also shown in simplified FIG. 6-2.

During the fourth phase PH4 734, output switch 406 is enabled connecting the output Vo to the capacitor 423, and the other side of the capacitor 423 is connected to VCM by switch 426, thereby coupling the capacitor 423 voltage (VrefP/N−VCM)+VCM to Vo, transferring a charge value of C*V. During the fourth phase PH4, all of the capacitors C 423 of all of the multipliers of each PE on the respective columns are connected together 736 (positive charges and negative charges on respective lines 180-c(+) and 180-c(−), thereby generating a charge value at each column representing a value of the dot product, the 16 columns providing the 1×16 dot product vector.

Figure 2G:
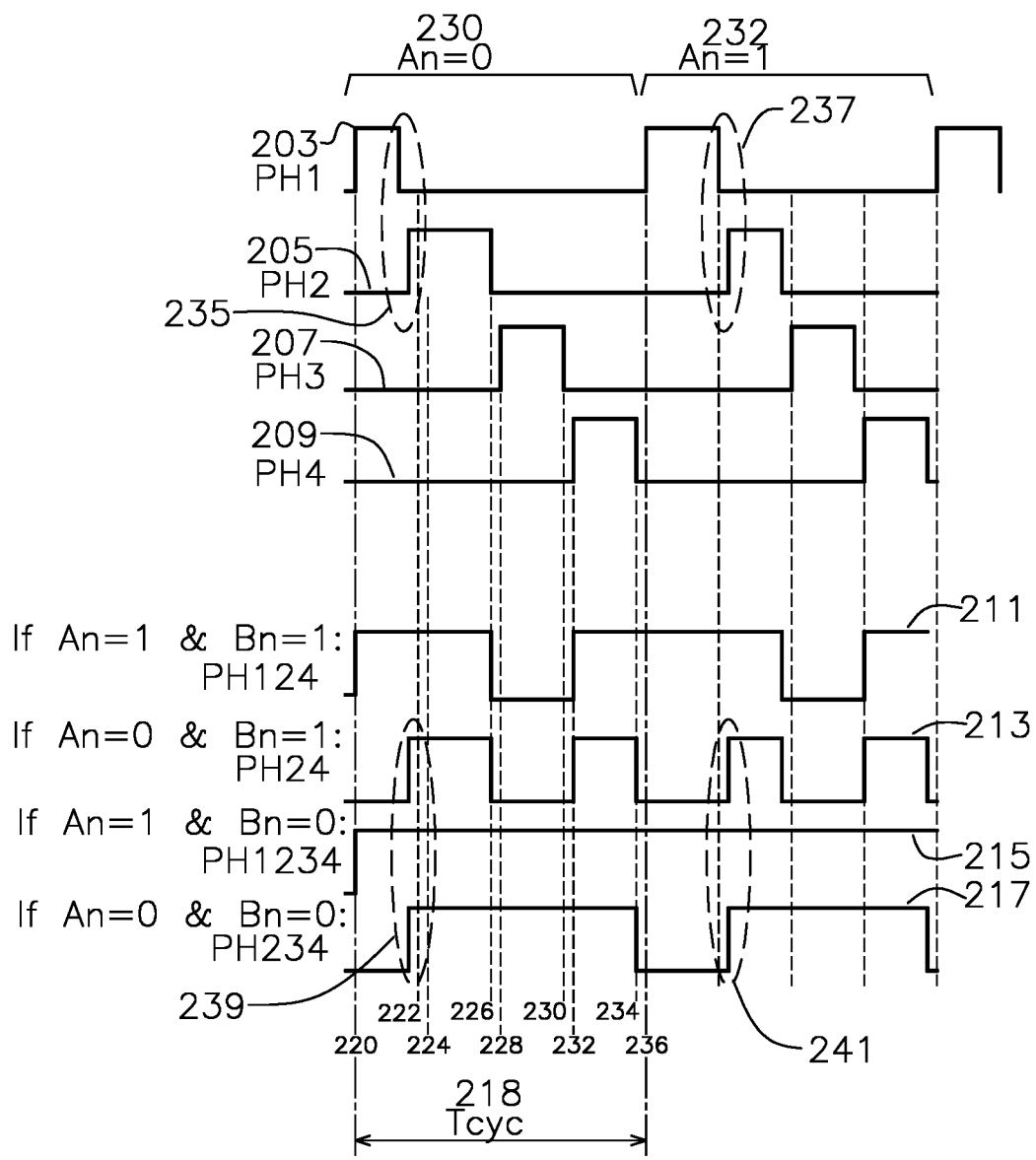
FIG. 2G shows waveform plots for an alternative embodiment of FIG. 2E.

FIG. 2G is a timing diagram showing an additional embodiment of the invention with respect to the generation of PH1 and PH2. Because PH1 is used to either charge the capacitor 423 of each multiplier cell 420-n, or not change the charge of an uncharged capacitor 423 during PH1, the duration of PH1 may be varied depending on whether C is being charged or not according to an, as shown for the waveforms during interval 230 when $a_n$=0 and C is not charged to VrefP or VrefN, shortening PH1 and lengthening PH2 with PH3 and PH4 unchanged. The case of $a_n$=1 and charging C to VrefP or VrefN during clock cycle 232 requiring a longer PH1 and shortened PH2 is shown in region 236. Shortened PH1 regions 234 and 238 of FIG. 2G, and lengthened PH1 regions 236 and 240 may be compared with the nominal equal PH1 and PH2 of FIG. 2E. The clock generation embodiment of FIG. 2G provides greater accuracy as capacitor charge time is an inverse exponential plot for voltage vs time, which may cause errors for larger values of C 423 and shorter clock cycle times. In one example of the invention only the most significant bit $a_6$ is switched in this manner, in other examples of the invention, additional multiplier cell capacitors are switched as well.

FIG. 6-3 shows an example single multiplication inside a PE for a value of a and b, where a=70 decimal (0x46 hexadecimal) and b=121 decimal (0x75 hexadecimal) with the charge stored at each clock phase indicated. The first column indicates the relative size of capacitor C according to bit position, the columns for PH1 indicate Vc at each capacitor (which depend on the an value and associated charge (C*V), the second column PH2 shows the charge redistribution of the example 70Vp proportional to capacitance of each multiplier, and column 3 shows the cancellation of charge for each multiplier capacitor where $b_n$=0, with the total remaining charge contribution of the example PE summed with other PEs in the present column. The charge 121/128*70Vp thereby represents the charge contribution of this PE to the multiplication, showing the result 121*70 (scaled by 128) for the example PE.

As indicated in step 738, at the end of each of the four phases of a clock cycle, the sum charge on each column from all of the capacitor C 423 for each column coupled together (preferably each column output segregated by VrefP or VrefN) provides the desired output as a charge value, which can be coupled to a discharged output capacitor for each column, and the voltage at each column capacitor can be read to form the output dot product vector 740 resulting from the previous steps 708.

FIG. 8A shows a block diagram of a successive approximation (SA) accumulator in sample mode. The SA accumulator 800 has multiple accumulator banks 802-1 through 802-4 for storage of multiple results controlled by accumulator register select 814 and commonly clocked by accumulator clock 806 for simultaneous storage of one accumulated charge while performing a conversion of a different charge. In one example of the invention, there is one accumulator 800 of FIG. 8A for each column. In sample mode, the incoming charge on column line 180-c is coupled to all capacitors 825-1 through 825-*m* of bank 1 with switches 824-1 though 824-*m* in the accumulate position shown, and switch 804-1 is closed, which provides that all capacitors 825-1 through 825-*m* are in parallel with the charged capacitors of all PEs during PH4, and the voltage that is transferred to the capacitors 825-1 through 825-*m* goes as the ratio of $V_{totalPE} * 2C_{SAR}/(2C_{SAR}+C_{totalPE})$, where $2C_{SAR}$ represents the total capacitance of 825-1 through 825-*m*, and $V_{totalPE}$ is the voltage developed across all PEs (representing the summed dot product for column C expressed as a voltage. Since $2C_{SAR}$ is a constant, the result of the charge transfer is a scaling factor dependent on Cref of the PE and $C_{SAR}$ 825-1. Each capacitor 825-1 through 825-*m* has ½ of the capacitance of the previous capacitor, such that when all 825-1 through 825-*m* capacitors are in parallel, the total SAR capacitance approaches 2C. Successive approximation register generating AD_OUT is clocked by ADC Clock (ADC CLK 810 generated by SAR controller 830. Comparator 813 compares the stored voltage on the capacitors with common mode voltage VCM previously described.

FIG. 8B shows the SA ADC configured for conversion of the charge stored in capacitors 825-1 through 825-*m*. Switch 806-1 is set to select Vref, switch 804-1 is opened, and switch 822-1 is closed, thereby coupling the polarity reversed capacitor 825 voltage Vc to the input of comparator 813. The successive approximation is best understood in combination with FIG. 8C, which shows a simplified schematic drawing with the voltage distribution shown. The transferred charge and voltages of FIG. 8B are shown with respect to VCM as generated by the analog cell, as this is an offset voltage the explanation of SA conversion of FIGS. 8C-1 through 8C-4 is shown with respect to GND at the input to comparator 813, with the capacitor bank switching between GND and VREF for clarity in this example. The capacitors 825-1 through 825-*m* are successively switched 824-1 through 824-*m* from largest value to smallest value to select between Vref and ground by comparator 830.

FIG. 8C-1 shows the initial state of the SA capacitor bank and input to the comparator 813, with the input to the comparator at capacitor value −Vin. For clarity and understanding the successive approximation process, the comparisons are with respect to ground rather than VCM of the present invention. FIG. 8C-2 shows the first selection, which results in a division of charge between capacitors and the input changes to −Vin+(½)Vref (also seen in the waveform 815 of FIG. 8C-4 showing the time progression of the successive approximation. FIGS. 8C-2, 8C-3 show the next two successive approximation decision steps. At each point, the comparator 813 tests to determine whether to switch the next ½ capacitor into the circuit, which redistributes the charge and input to the comparator as shown. FIG. 8C-4 shows a plot of the time progression of selections which results in an output AD_OUT 101 0111 for the example shown, and the input to the comparator cycles about Vref, getting closer and using smaller increments by a factor of ½.

Figure 8D:
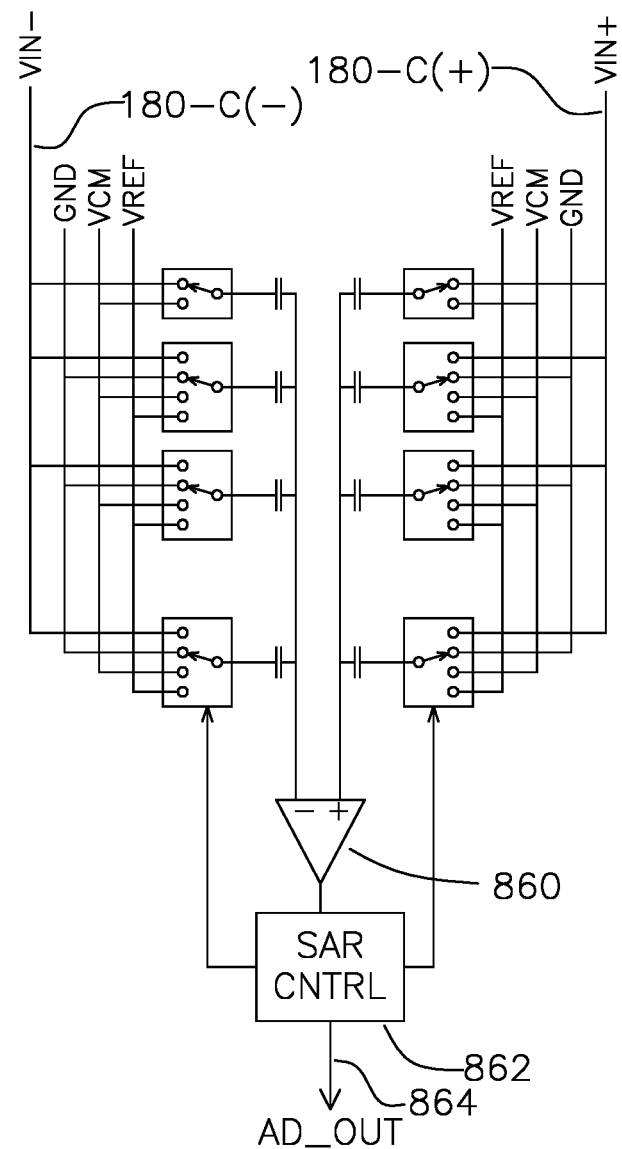
FIG. 8D shows a block diagram for a positive/negative SA ADC for use with PEs providing differential outputs.

FIG. 8D shows a successive approximation block diagram for use where the PE has separate positive and negative outputs, the 180-C(+) input for positively charged capacitors (capacitors charged at VrefP), and the 180-C(−) input for negatively charged capacitors (capacitors charged at VrefN) for summing the charges of each column, operating similarly to the SA ADC of FIGS. 8A and 8B. Comparator 860, SAR controller 862 sequentially generator the digital bits forming output 864, as is well known in SAR Analog to digital converters.

Figure 9:
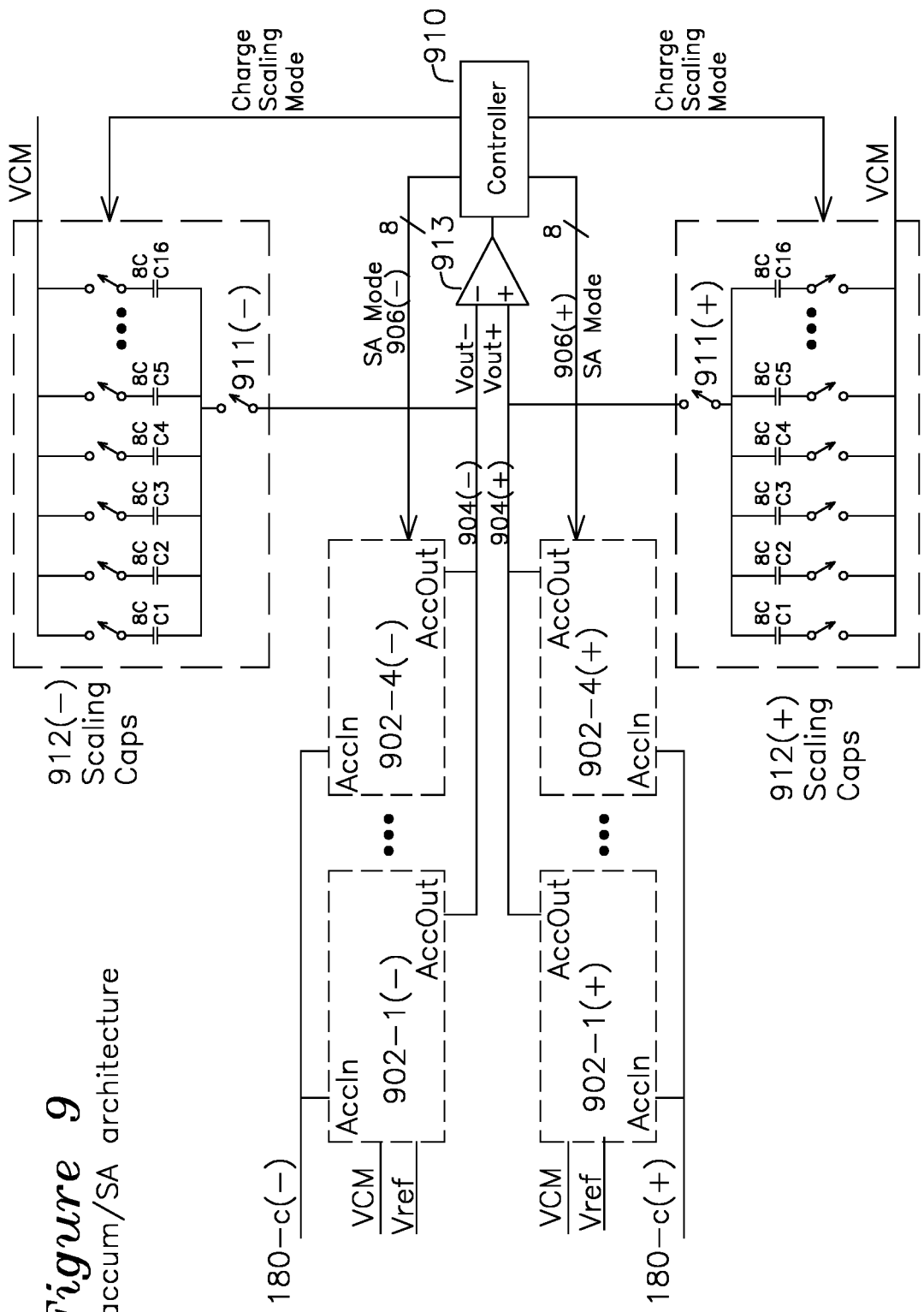
Figures 1, 9A:
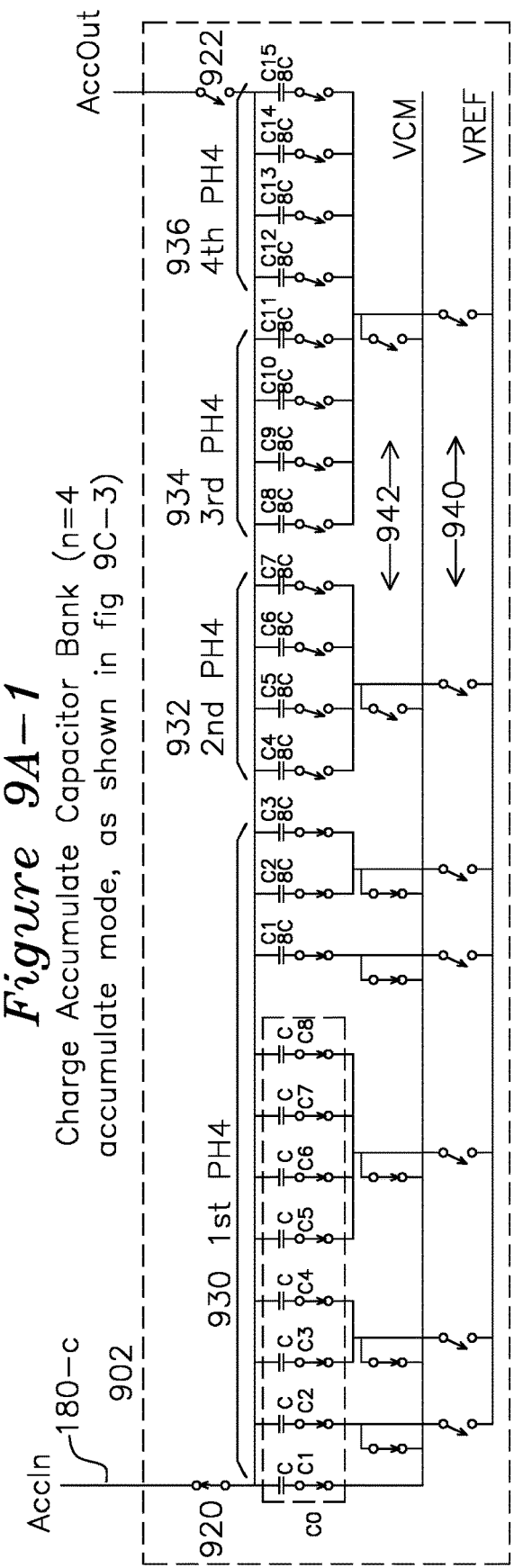
Figures 2, 9A:
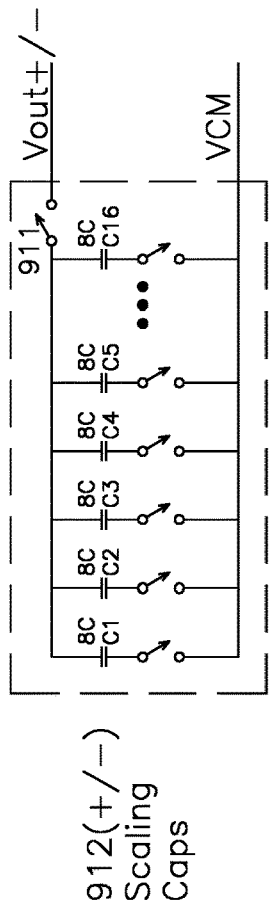

FIG. 9 shows another embodiment of the dot product invention suitable for forming dot products in excess of 16×16 or in multiples of 16 dot product operations. With the example architecture shown in FIG. 9, it is possible to form dot products from a 1×16 A vector with a 16×256 B coefficient by performing accumulations of the dot product between the 1×16 A matrix with any number of 16×16 coefficient matrices, shown for up to 16 such coefficient matrices in the present example. The example of FIG. 9 accumulates each PH4 positive result on column line 180-c(+) and each negative accumulation result on column line 180-(c), as before. A variable number of accumulation capacitor banks 902-1 to 902-4 for each positive (+) and negative (−) column line each have an accumulator input (AccIn) and accumulator output AccOut, with VCM and Vref reference voltages, as before. A single accumulator capacitor bank 902 is shown for clarity without suffix numbers or polarity, and is understood to be repeated for each of the corresponding blocks shown in FIG. 9. Comparator 913 is operative to perform comparison operations during successive approximation conversion steps and outputs a binary result to Controller 910, which also generates the serial digital output (not shown), as well as handles the configurations for each mode of the accumulator capacitor banks 902 and charge scaling capacitor banks 912 of FIG. 9 where the charge scaling caps are individually switchable by controller 910 or may be removed or added using switch element 911. The operation of the dot product accumulator is shown in subsequent figures for the internal configuration in each of these modes: charge accumulation (FIG. 9A), charge averaging and scaling (FIG. 9B), successive approximation initialization (FIG. 9C), and charge conversion to digital value using successive approximation (FIG. 9D). Each of these operations and switch configurations is performed by controller 910.

Figures 1, 9B:
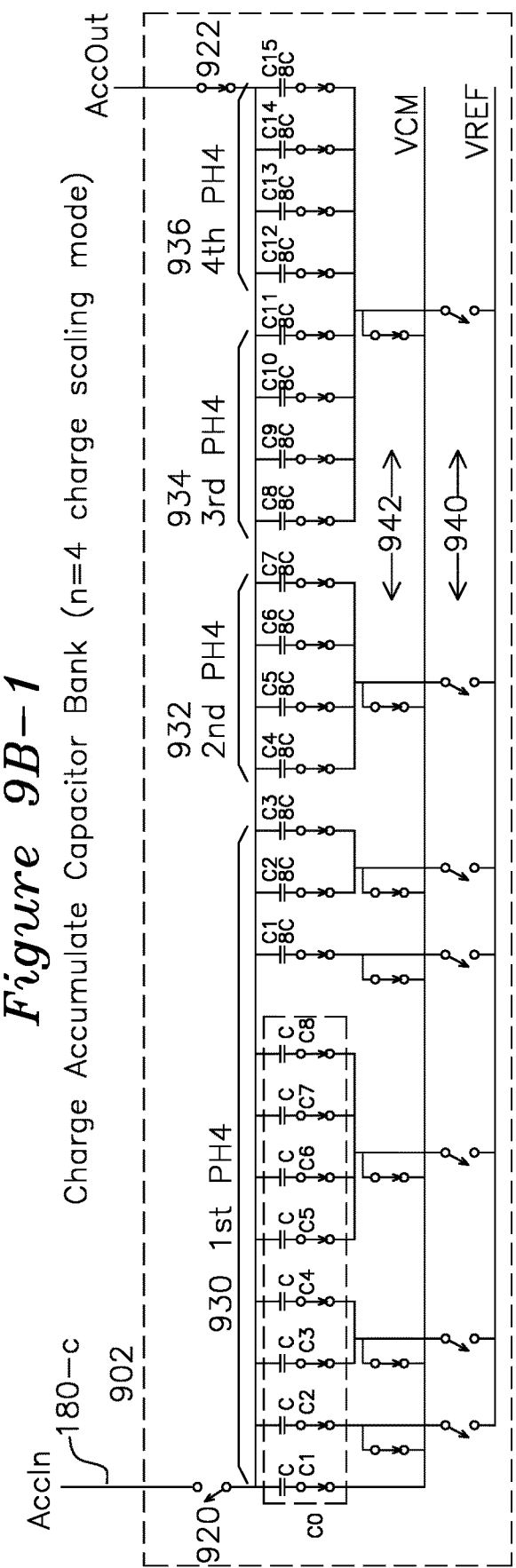
Figures 2, 9B:
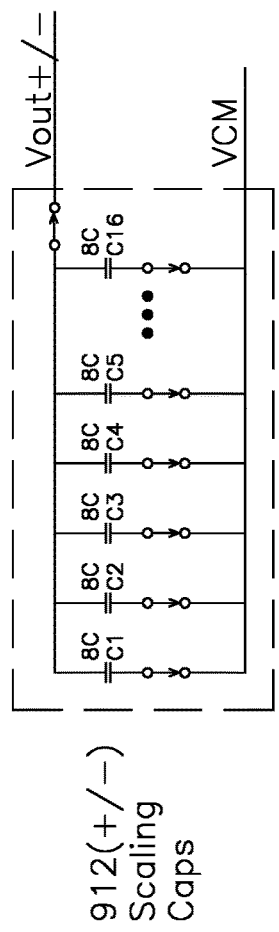

FIG. 9B-3 shows the various accumulator and charge scaling configurations for various numbers of dot product accumulations n. FIGS. 9A-1 and 9A-2 is operative for the charge accumulation mode for n=4 dot products (1×16A matrix multiply/accumulate with 4 16×16 coefficient registers, each of the four dot product results separately accumulated (in this example using the assignments of FIG. 9B-3), then combined and scaled, with an example one of the charge accumulation positive bank 902(+) and charge accumulation negative bank 902(−) having switch 920 closed (for the accumulator 902 to receive the charge) and switch 922 open, with all capacitor switches in 902 having 8 capacitors of value C (C1 through C8 930) with associated switches closed and connecting lower capacitor plates to VCM as shown. Charge accumulation capacitor bank 902 is re-configured to receive dot products delivered as a charge transferred on each PH4 to a different 4*8C capacitor bank starting with C0 930, in the present n=4 example, the first accumulate result goes to the capacitors of 930 with switches closed (comprising a total of 4*8C capacitance), the second dot product result to the capacitors 932, the third to 934, and the fourth to 936, each of the dot product results transferring charge to 4×8C of capacitance. The charge scaling bank 912 is shown in FIG. 9A-2 for reference with all capacitor switches open and not transferring any charge. At the end of the n=4 charge transfer cycles to the positive and negative associated accumulator capacitors and using the assignments of FIG. 9B-3, there are four groups of four capacitors (16 individual 8C capacitors) holding charge (with C0 930 having 8 1C capacitors acting as a single unit of 8C charge), in the present n=4 example.

FIGS. 9B-1 and 9B-2 show the charge summing or averaging mode, which connects all of the used capacitors of FIG. 9B-1 and shown for the case of n=4 of FIGS. 9A-1 and 9A-2, where the charge was separately transferred to the four groups of 4×8C capacitors, each of the four groups representing the dot product as a stored charge. In the charge averaging and scaling step, the four groups of capacitors 930, 932, 934, and 936 are connected together (16 8C capacitance), and simultaneously scaled by 2 by connecting 16 capacitors of 9B-2, as shown in column 975 of FIG. 9B-3. At the end of the operations of FIGS. 9B-1 and 9B-2, the average dot product is expressed as the charge distributed across all of the selected capacitors, resulting in a sum of charge distributed as an equal voltage on the active (selected) capacitors of 902 and 912. Charge scaling can be accomplished in this step by connecting the same number of capacitors in capacitor scaling bank 912 of FIG. 9B-2 as were used for storage in capacitor accumulator 902. Other scaling factors may also be selected by selecting a different number of capacitors in capacitor bank 912. The charge scaling is realized by disconnecting scaling capacitors 912 at time of A/D conversion of FIGS. 9C-1 and 9C-2.

The table of FIG. 9B-3 shows possible charge accumulation capacitor bank configurations for use during charge accumulation and charge scaling operations for multiple dot product computations up to n=16 accumulations for a single column. Column 970 indicates the number of dot products n being summed, column 971 is the number of 8C accumulation capacitors in 902 required to store a single dot product, and column 972 indicates the total number of capacitors of 902 (column 970 multiplied by column 971) in use at the last dot product. Column 973 indicates the number of empty accumulator capacitors in 902 for the given number of dot product accumulations (column 970), column 975 indicates the number of scaling capacitors from 912 to perform an example charge scaling by 2, and column 974 shows the corresponding number of empty 8C capacitors. The number of charge scaling capacitors in column 975 (from charge scaling capacitors 912) and 973 from accumulator 902) are connected to scale by 2 (preserving charge but halving the voltage), and the charge scaling capacitors are then removed during SA ADC operations, so that the total charge measured is ½ of the previous value.

Figures 1, 9C:
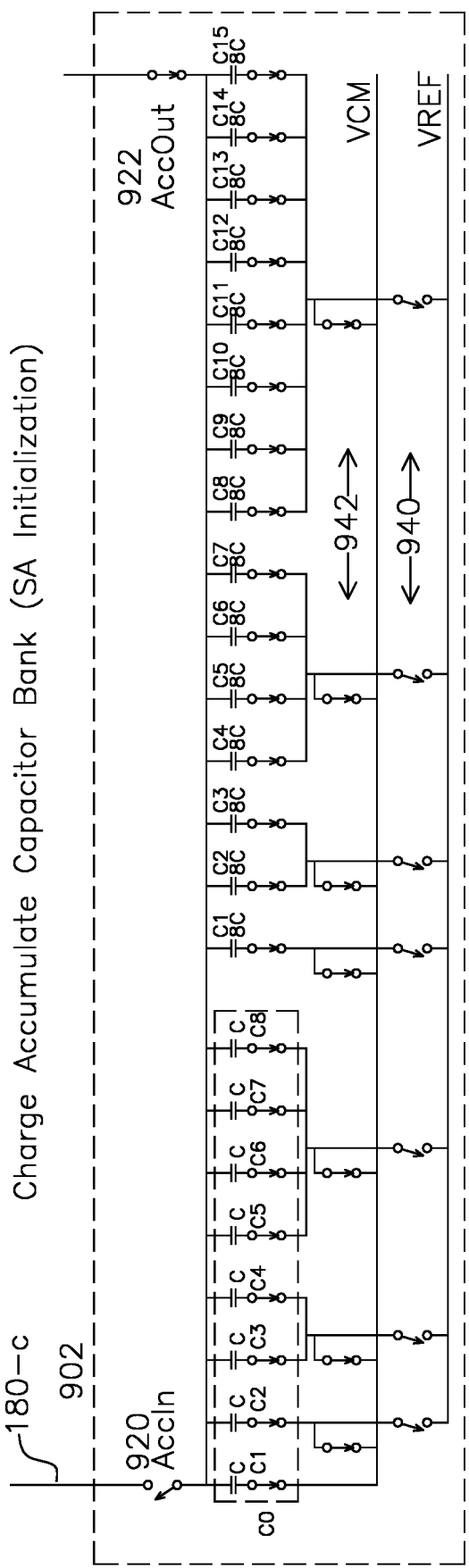
Figures 2, 9C:
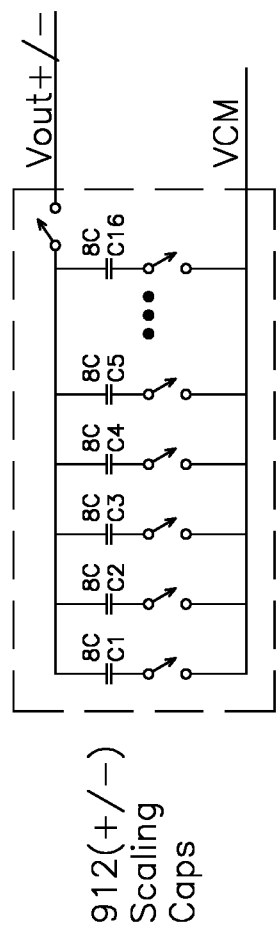
Figures 1, 9D:
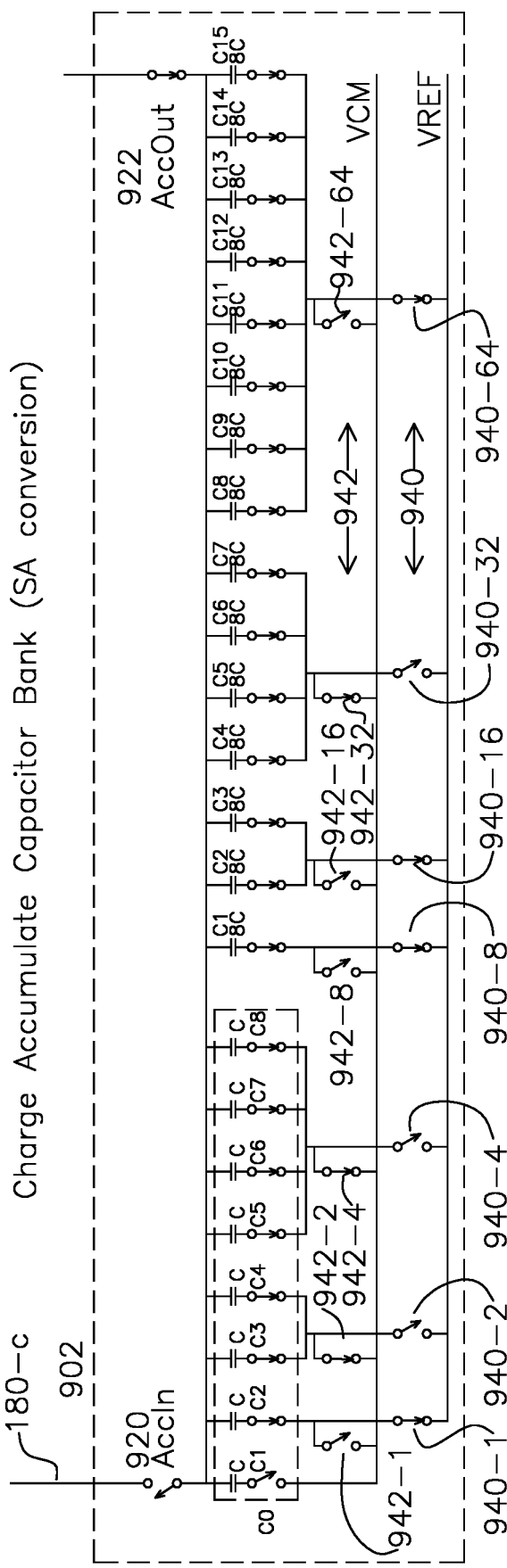
Figures 2, 9D:
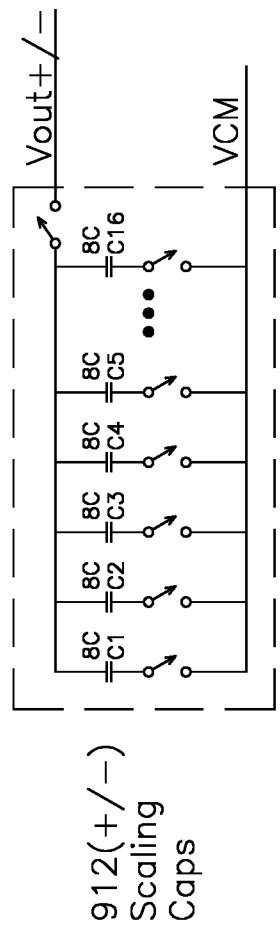

FIG. 9C-1 shows the successive approximation (SA) initialization configuration, where all of the capacitors of the charge accumulation bank are equalized for charge by connecting all of them together with the charge scaling bank of FIG. 9D-2 switched out of the circuit with the 942 switches all closed and 940 switches all open. Although the present n=4 example configuration of column 972 shows all 16 capacitors already in use, it can be seen that other configurations such as n=9 use as few as 9 capacitors in the accumulation bank. During the initialization of the SA operation of FIG. 9C-1, all capacitors of 902 are connected together and the capacitors of 912 of FIG. 9C-2 are switched out.

FIG. 9D-1 shows the SA conversion configuration, where capacitors 940-1 (C), 940-2 (2C), 940-4 (4C), 950-8 (8C), 940-16 (16C), 940-32 (32C), and 940-64 (64C) have a lower plate which is switched exclusively between VCM and VREF using lower switches 940 and 942 (exactly one switch closed at a time), starting with 64C, and with both the positive and negative capacitor banks switching simultaneously for each bit selection as was previously described, until the smallest C value is switched, to produce the final digitized result which is output by controller 910 of FIG. 9.

FIG. 9E presents an overview of the four modes of operation in a flowchart. Step 990 corresponds to FIG. 9A configuration storing charge in each 8C accumulator capacitor at the end of each PH4 dot product operation, and step 992 is the connection of all used capacitors together of FIGS. 9B-1 and 9B-2. Step 996 corresponds to the operation of FIGS. 9C-1 and 9C-2, and step 998 corresponds to the successive approximation conversion of FIGS. 9D-1 and 9D-2.

Figure 10:
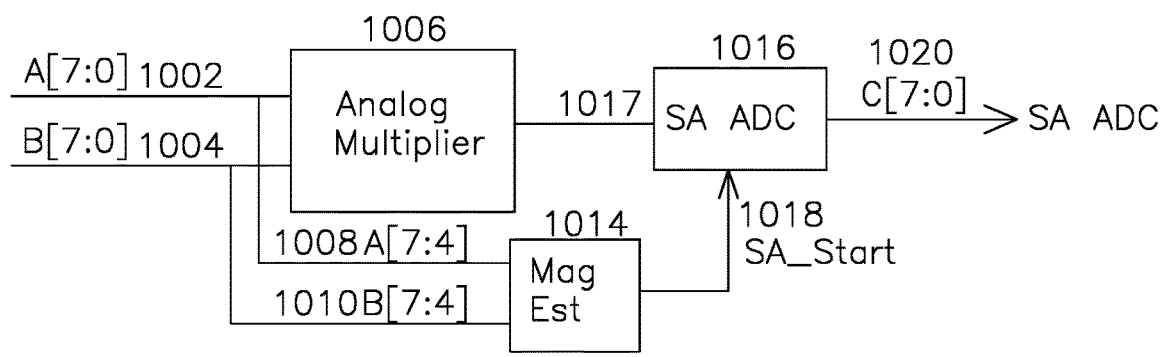
FIG. 10 shows a block diagram for an analog multiplier with a magnitude estimator

FIG. 10 shows an analog multiplier 1006 receiving digital input A[7:0] 1002 and digital input B[7:0] 1004 and generating an analog output 1017 to be converted to a digital value 1020 C[7:0] of similar resolution C[7:0] (generally less than 16 bit resolution) of the digital inputs 1002 or 1004), the ADC conversion performed by SA ADC 1016. The magnitude estimator 1014 examines most significant bits 1008A and 1008B of the digital inputs A[7:0] and B[7:0], and estimates the resulting output based on the number of leading 0s. For example, for 8 bit result truncation (discarding the least significant 8 bits of a 16 bit multiplication result of two 8 bit binary values in integer form), 0x1f (with three leading 0s) multiplied by 0xff (with no leading zeros) results in 0x1e (three leading zeros). Multiplication of 0x1f by 0x1f (3 leading zeros each) results in 0x03 (6 leading zeros). In this manner, the number of leading zeros of the multiplicands may be used to shorten the number of SA conversions required in a value-specific manner, such as by starting the SA conversion with the MSB capacitors and those following in the "0" position for each 0 bit of the A and B inputs. Magnitude estimator 1014 estimates the magnitude of the resultant output, and for lower estimated magnitudes, such as by counting the number of leading zeros of the multiplicands and starting the SA conversion with the switched capacitors in the associated switched state associated with the output 0 bits, resulting in shorter conversion time. In one example of the invention, magnitude estimator 1014 computes the sum of the number of leading 0s in the binary values 1002 and 1004, and provides that value as the value SA_Start 1018 to SA ADC 1016.

Figure 11:
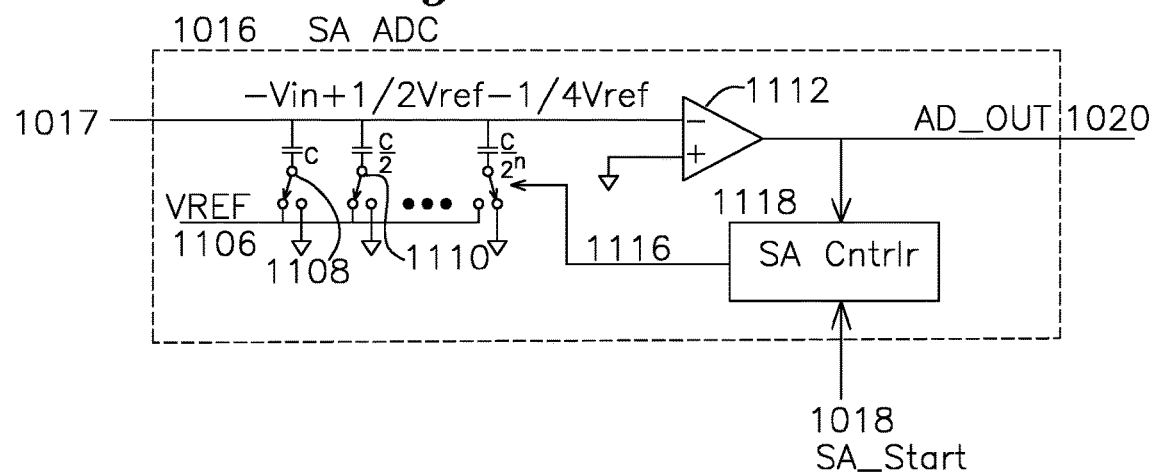
FIG. 11 shows a Successive Approximation Digital to Analog Converter for FIG. 10.

FIG. 11 shows a detail example of SA ADC 1016, where the SA controller 1118 receives the SA_Start 1018 value and initializes the capacitors 1108 to 1110 with respect to a reference voltage Vref 1106 and other capacitors with respect to ground according to the sum of leading multiplicand 0s present as asserted by SA Controller 1118 output 1116, starting the SA at the sum to completion. For two p=8 bit multiplicands and a q=8 bit multiplication output with r being the sum of the number of leading zeros in the multiplicands, the number of remaining successive approximations required to complete the conversion is q-r. For example, if the sum of leading 0s in the multiplicands is 5, for an 8 bit conversion, only 3 successive approximations are required to generate the final result, which will have the same accuracy as if the conversion were performed completely without the SA_Start initialization of the magnitude estimator.

Other dot product configurations and associated operations are also possible. For example, it is possible to perform a dot product multiply-accumulate of larger matrices, such as a 1×128 A matrix with a 128×16 B matrix by accumulating 8 multiply-accumulate values for each column to generate the final dot product result. In a different type of operation, it is also possible to perform 2D convolution by moving a small weighting matrix across a large coefficient matrix and compare the resulting dot products for each movement operation.

The present examples are provided for illustrative purposes only, and are not intended to limit the invention to only the embodiments shown.

We claim:

1. A dot product multiplier for multiplying a 1×m A matrix with an m×m B matrix to form a dot product, each element of the A matrix and each element of the B matrix comprising a sign bit and value bits, the dot product multiplier comprising:
    a clock generator providing four non-overlapping phases of clock per clock cycle, the four phases being PH1, PH2, PH3, PH4;
    a plurality of processing elements arranged in said m columns and said m rows, each processing element receiving an 'a' element of the A matrix and a 'b' element of the B matrix and generating a processing element output;
    each processing element comprising:
       a sign voltage source providing a sign voltage which is a positive voltage for positive multiplication results and a comparatively negative voltage for negative multiplication results based on a sign bit of the 'a' element and sign bit of the 'b' element;
       a bit multiplier for each particular 'a' element value bit $a_n$ and each 'b' element value bit $b_n$, each bit multiplier having an output, the bit multiplier comprising:
          a capacitor having a capacitance $Cref*2^n$, the capacitor initialized to the sign voltage during the first clock phase PH1 if $a_n=1$, and initialized to 0V if $a_n=0$;
          the bit multiplier coupling the capacitor to capacitors of other bit multipliers during the second clock phase PH2;
          the bit multiplier zeroing the charge on the capacitor if $b_n=0$ on the third clock phase PH3;
          the bit multiplier coupling the capacitor of the bit multiplier to the processing element output during the fourth phase PH4;
       each of the m columns having an accumulator, the accumulator receiving a transferred charge from the bit multiplier outputs in a respective column during the fourth phase PH4;
       each accumulator converting the transferred charge to a digital value indicating a dot product value for an associated column.

2. The dot product multiplier of claim 1 where the sign voltage source generates VrefP for a positive sign, VrefN for a negative sign, and VCM as a reference voltage.

3. The dot product multiplier of claim 2 where VCM=(VrefP+VrefN)/2.

4. The dot product multiplier of claim 1 where the bit multiplier further comprises:
    a first terminal of the capacitor coupled to Internal Voltage (Vint) and to an output switch coupling the first terminal of the capacitor to the output during PH4;
    a PH3 switch which couples Vint to Common Voltage (VCM) during PH3;
    a ClkCHSH1 switch coupling a second terminal of the capacitor to VCM during PH1 when $a_n=1$.

5. The dot product multiplier of claim 4 where the CLKCHSH1 switch couples the second terminal of a bit multiplier capacitor to VCM during the second phase PH2.

6. The dot product multiplier of claim 4 where the CLKCHSH1 switch couples the second terminal of a bit multiplier capacitor to VCM during the third phase if $b_n=0$.

7. The dot product multiplier of claim 4 where the CLKCHSH1 switch couples the second terminal of the capacitor to VCM during the fourth phase.

8. The dot product multiplier of claim 1 where 'b' elements of the B matrix and 'a' elements of the A matrix are stored in each processing element before clock phase PH1.

9. A process for forming dot products of a 1×m A matrix with an m×m B matrix, the process operative on an m column and m row array of processing elements (PE), the A matrix having 'a' elements and the B matrix having 'b' elements, each 'a' element and each 'b' element comprising a sign bit and n value bits, each processing element comprising a sign voltage source and a plurality n of multipliers, each multiplier operative on a unique value bit $a_n$ of a value of the A matrix and a value bit of the B matrix, the process comprising:
    charging a multiplier capacitor in each multiplier to a sign voltage provided by the sign voltage source during a first clock phase PH1 if a corresponding bit $a_n$ is 1;
    sharing capacitor charge across all multiplier capacitors during a second clock phase PH2;
    clearing a charge from the multiplier capacitor if a value bit $b_n$ of the B matrix is 0 during a third clock phase PH3;

connecting all processing element multiplier capacitors of each column together and converting the charge of each column to a digital output value during a fourth clock phase PH4.

10. The process of claim 9 where each of the m rows of processing elements are operative on an element a of the A matrix.

11. The process of claim 9 where the processing elements are loaded with particular elements of the B matrix before the first clock phase PH1.

12. The process of claim 9 where during the fourth clock phase, the charge from the PEs of each column are converted to digital values to form a dot product output.

13. The process of claim 9 where the sign voltage source provides a value VrefP if the 'a' sign bit and the 'b' sign bits are either both positive or both negative.

14. The process of claim 9 where the sign voltage source provides a value VrefN if the 'a' sign bit and the 'b' sign bits are different values.

15. The process of claim 9 where each multiplier capacitor has a value $Cref*2^n$ and n is 0 for the least significant bit and increments by one for each bit of increasing significance.

* * * * *